United States Patent [19]
Bahreman

[11] Patent Number: 6,061,665
[45] Date of Patent: May 9, 2000

[54] SYSTEM, METHOD AND ARTICLE OF MANUFACTURE FOR DYNAMIC NEGOTIATION OF A NETWORK PAYMENT FRAMEWORK

[75] Inventor: Ali Reza Bahreman, San Diego, Calif.

[73] Assignee: Verifone, Inc., Redwood City, Calif.

[21] Appl. No.: 08/870,311

[22] Filed: Jun. 6, 1997

[51] Int. Cl.[7] .................................................. G06F 17/60
[52] U.S. Cl. ............................................. 705/40; 705/26
[58] Field of Search .......................... 705/40, 26; 380/24

[56] References Cited

U.S. PATENT DOCUMENTS

| | | | |
|---|---|---|---|
| 3,651,511 | 3/1972 | Andrews et al. | 340/324 |
| 3,956,615 | 5/1976 | Anderson et al. | 235/61.7 B |
| 4,277,837 | 7/1981 | Stuckert | 364/900 |
| 4,303,904 | 12/1981 | Chasek | 340/23 |
| 4,454,414 | 6/1984 | Benton | 235/379 |
| 4,614,861 | 9/1986 | Pavlov | 235/380 |
| 4,630,201 | 12/1986 | White | 364/408 |
| 4,689,478 | 8/1987 | Hale et al. | 235/380 |
| 4,766,293 | 8/1988 | Boston | 235/379 |
| 4,799,156 | 1/1989 | Shavit et al. | 364/401 |
| 4,859,837 | 8/1989 | Halpern | 235/380 |
| 4,877,950 | 10/1989 | Halpern | 235/487 |

(List continued on next page.)

FOREIGN PATENT DOCUMENTS

| | | |
|---|---|---|
| 0 172 670 A2 | 2/1986 | European Pat. Off. . |
| 0 256 768 A2 | 2/1988 | European Pat. Off. . |
| 0 256 768 A3 | 2/1988 | European Pat. Off. . |
| 0 326 699 A2 | 8/1989 | European Pat. Off. . |
| 0 363 122 A2 | 4/1990 | European Pat. Off. . |
| 0 363 122 A3 | 4/1990 | European Pat. Off. . |
| 0 416 482 A2 | 3/1991 | European Pat. Off. . |
| 0 527 639 A2 | 2/1993 | European Pat. Off. . |
| 0 256 768 B1 | 3/1994 | European Pat. Off. . |
| 0 363 122 B1 | 12/1994 | European Pat. Off. . |
| 0 658 862 A2 | 6/1995 | European Pat. Off. . |
| 0 666 681 A2 | 8/1995 | European Pat. Off. . |
| 0 668 579 A2 | 8/1995 | European Pat. Off. . |
| 2 251 098 | 6/1992 | United Kingdom . |
| WO 91-16691 | 10/1991 | WIPO . |
| WO 93-08545 | 4/1993 | WIPO . |

OTHER PUBLICATIONS

Marvin Sirbu et al.;"NetBill: An Internet Commerce System Optimized for Network Delivered Services"; IEEE CompCon Conference (Mar., 1995).

Main webpage at www.amazon.com on Jul. 29, 1998.

"Multipurpose Internet Mail Extensions: MIME" with RFC 2045, 2046, and 2047 on the Internet at www.oac.uci.edu; dated 1996.

Pages from the Internet Shopping Network website at www.isn.com with the titles of "Home Page"; "Who Are We"; "Member Privacy & Security"; "Types of Membership"; "Payment Methods"; "Free Membership".

(List continued on next page.)

*Primary Examiner*—Allen R. MacDonald
*Assistant Examiner*—Michele Stuckey Crecca
*Attorney, Agent, or Firm*—Sanford E. Warren, Jr.; Daniel J. Chalker; Gardere & Wynne, L.L.P.

[57] ABSTRACT

A system that facilitates the coupling of a plurality of clients to one or more merchants utilizing a network to conduct commerce over the network is disclosed. When a client initiates a connection with a merchant, the merchant responds to the request for connection by transmitting one or more messages back to the client to determine a particular payment processing which entails determining a suitable payment instrument, a payment protocol and standard message formats for conducting the electronic commerce. The payment protocol comprises a message format, a protocol associated with the message format and a weight associated with each of the items associated with the payment processing. The weight is provided by both the client and the merchant to facilitate dynamic negotiation of a mutually acceptable payment processing. The negotiation results in the exchange of standard message formats that the client and the merchant are equipped to process efficiently and securely.

44 Claims, 3 Drawing Sheets

U.S. PATENT DOCUMENTS

| | | |
|---|---|---|
| 4,906,828 | 3/1990 | Halpern ................................... 235/379 |
| 4,935,962 | 6/1990 | Austin ....................................... 380/25 |
| 4,968,873 | 11/1990 | Dethloff et al. ........................ 235/380 |
| 4,984,155 | 1/1991 | Geier et al. ............................... 705/26 |
| 4,992,646 | 2/1991 | Collin ..................................... 235/375 |
| 4,992,940 | 2/1991 | Dworkin ................................... 705/26 |
| 5,016,274 | 5/1991 | Micali et al. ............................. 380/23 |
| 5,030,806 | 7/1991 | Collin ..................................... 235/375 |
| 5,175,416 | 12/1992 | Mansvelt et al. ....................... 235/379 |
| 5,220,501 | 6/1993 | Lawlor et al. ............................ 380/24 |
| 5,221,838 | 6/1993 | Gutman et al. ......................... 235/379 |
| 5,297,030 | 3/1994 | Vassigh .................................... 705/25 |
| 5,319,542 | 6/1994 | King, Jr. et al. ......................... 705/27 |
| 5,383,113 | 1/1995 | Kight et al. ............................... 705/40 |
| 5,420,405 | 5/1995 | Chasek ................................... 235/379 |
| 5,440,634 | 8/1995 | Jones et al. ............................... 380/24 |
| 5,448,045 | 9/1995 | Clark ...................................... 235/382 |
| 5,452,352 | 9/1995 | Talton ..................................... 379/355 |
| 5,453,601 | 9/1995 | Rosen ...................................... 235/379 |
| 5,455,407 | 10/1995 | Rosen ..................................... 235/380 |
| 5,459,304 | 10/1995 | Eisenman ............................... 235/380 |
| 5,461,217 | 10/1995 | Claus ...................................... 235/380 |
| 5,465,206 | 11/1995 | Hilt et al. ................................. 705/40 |
| 5,465,291 | 11/1995 | Barrus et al. ............................ 379/67 |
| 5,476,259 | 12/1995 | Weingardt ................................. 273/85 |
| 5,478,993 | 12/1995 | Derksen .................................. 235/380 |
| 5,485,510 | 1/1996 | Colbert .................................... 379/145 |
| 5,506,832 | 4/1996 | Arshi ....................................... 370/241 |
| 5,557,518 | 9/1996 | Rosen ...................................... 364/408 |
| 5,590,038 | 12/1996 | Pitroda ..................................... 385/241 |
| 5,590,197 | 12/1996 | Chen et al. ............................... 380/24 |
| 5,594,910 | 1/1997 | Filepp et al. ....................... 395/800.28 |
| 5,644,727 | 7/1997 | Atkins ...................................... 705/40 |
| 5,649,117 | 7/1997 | Landry ..................................... 705/40 |
| 5,666,493 | 9/1997 | Wojcik et al. ............................ 705/26 |
| 5,671,279 | 9/1997 | Elgamal .................................... 380/23 |
| 5,671,280 | 9/1997 | Aucsmith et al. ........................ 380/30 |
| 5,677,955 | 10/1997 | Doggett et al. ........................... 380/24 |
| 5,703,949 | 12/1997 | Rosen ....................................... 380/21 |
| 5,715,314 | 2/1998 | Payne et al. .............................. 380/24 |
| 5,729,594 | 3/1998 | Klingman ............................. 379/93.12 |
| 5,742,845 | 4/1998 | Wagner ................................... 395/831 |
| 5,754,772 | 5/1998 | Leaf .................................. 395/200.33 |
| 5,768,385 | 6/1998 | Simon ...................................... 380/24 |

OTHER PUBLICATIONS

Anderson, R.J., UEPS—A second Generation Electronic Wallet, (1992) University of Cambridge Computer Laboratory, pp. 411–418.

Bank Systems Technology, SET Tool Kit for Secure Commerce, (May 1996) p. 16.

Bellare et al., iKP—A Family of Secure Electronic Payment Tools, USENIX Association, First USENIX Workshop on Electronic Commerce, (Jul. 11–12, 1995) pp. 89–106.

Bryant, A., Am I Bid Six? Click to Bid Six!, The New York Times, (Mar. 13, 1996) pp. D1–D6.

Camp et al., Token and Notational Money in Electronic Commerce, USENIX Association, First USENIX Workshop on Electronic Commerce, (Jul. 11–12, 1995) pp. 1–12.

Cox et al., NetBill Security and Transaction Protocol, USENIX Association, First USENIX Workshop on Electronic Commerce, (Jul. 11–12, 1995) pp. 77–88.

One–Click Software Distribution Via the Web, Cutting Edge, Datamation, (May 1, 1996), p. 16.

Software Taps Net for Supply Data Sharing, Purchasing, EBN, (Apr. 22, 1996), p. 50.

Flohr, U., Electronic Money, Byte, (Jun. 1996), p. 74.

Gifford, et al., Payment Switch for Open Networks, USENIX Association, First USENIX Workshop on Electronic Commerce, (Jul. 11–12, 1995), pp. 69–75.

Gosling, et al., The Java Language Environment a White Paper, Sun Microsystems Computer Company, (May 1995).

Jones, et al., Securing the World Wide Web, Smart Tokens and Their Implementation, World Web Journal, O'Reilly & Associates, Inc., (Dec. 11–14, 1995), pp. 397–409.

James, J., Retrofitting Network Security to Third–Party Applications—The SecureBase Experience, USENIS Association, UNIX Security Symposium IV, (1993) pp. 41–57.

Marshall, M., Banking on the Internet, Communications Week, (May 20, 1996) No. 611.

Messmer, E., ActiveX Pioneer Pushes a Commerce, Network World, (May 6, 1996) p. 33.

Messmer, E., Edify Soft to Let Banks Open Doors Online, Network World, (May 20, 1996).

Messmer, E., Start–Up Puts Security SOCKS on Windo Apps, Network World, (May 20, 1996).

Microsoft and VeriFone Announce Agreement to Deliver Commerce–enabled Internet Retailing Solutions, Microsoft Press Release, (Aug. 5, 1996) pp. 1–3.

Real Security, Mondex Magazine, (Summer 1996) pp. 5–6.

What's Up Doc?, That's Infotainment, Mondex Magazine, (Summer 1996) pp. 8–10.

Ready to Go. The Trillion Yen Business, Mondex Magazine, (Summer 1996) pp. 27–29.

Morgan, L., Cashing In: The Rush is on the Make Net Commerce Happen, Internet World, Feb. 9, 1995), pp. 48–51.

Nash, et al., Vendors Deliver IS–Specific Apps Over the 'Net, News (May 6, 1996) p. 16.

Nee, E., Hatim Tyabji, Upside, (Sep. 1996) pp. 85–93.

Neuman, et al., Requirements for Network Payment: The NetCheque™ Perspectice, University of Southern California, (1995) pp. 32–36.

Ozer, K., Online Software Stores, PC Magazine, (May 28, 1996), p. 36.

Rodriguez, K., Pushing the Envelope, Communications Week, (May 13, 1996) pp. 37–39.

Rupley S., Digital Bucks? Stop Here, PC Magazine, (May 28, 1996), pp. 54–60.

Semilof, M., Boosting Web Business, Communications Week, (May 20, 1996) pp. 31–32.

Sibert et al., The DigiBox: A Self–Protecting Container for Information Commerce, First USENIX Workshop on Electronic Commerce, (Jul. 11–12, 1995), pp. 171–183.

Sirbu, et al., NetBill: An Internet Commerce System Optimized for Network Delivered Services, Carnegie Mellon University, (1995) pp. 20–25.

Sliwa, C., Netscape Unveils New 'Net Commerce Offerings, Network World, (May 13, 1996) p. 10.

Singleton, A., Cash on the Wirehead, Byte, (Jun. 1995) pp. 71–78.

Tang, et al., A Set of Protocols for Micropayments in Distributed Systems, First USENIX Workshop of Electronic Commerce, (Jul. 11–12, 1995) pp. 107–115.

Thompson, et al., A secure Public Network Access Mechanism, UNIX Security Symposium, (1992) pp. 227–238.

Trommer, D., ECS Catalog Merges EDI/Net Platforms: Enables Online Ordering in EDI Format Over Net, EBN, (May 20, 1996) p. 54.

Trommer, D., GE/Netscape Form Software Venture: Will Focus on Electronic Commerce Solutions, EBN, (Apr. 22, 1996) p. 54.

Vaughan–Nichols, Steven, Xvision Turns a PC Into X Terminal for Unix, VMS Host, Government Computer News, Jul. 8, 1996, pp. 38, 42.
Vincenzetti et al., STEL: Secure TELnet, 5th UNIX Security Symposium, Jun. 5–7, 1995.
Wexler, Joanie, AT&T Sell Insurers on the Web, Network World, May 20, 1996, p. 27.
Wiggins, Richard, Business Browser: A Tool to Make Web Commerce Secure, Internet World, Feb. 1995, pp. 52, 54, 55.
Yacobi, Yacov, Efficient Electronic Money, Official Gazette, Apr. 23, 1996, p. 2976.
Yee et al., Secure Coprocessors in Electronic Commerce Applications, First USENIX Workshop on Electronic Commerce, Jul. 11–12, 1995, pp. 155–169.
ABA Banking Journal, Will SET Kill Card Fraud On The Internet?, Apr. 1996, pp. 237–238.
Advertising Age, Visa Turns to Redgate for Online, CD–ROM Work; Sample the Surf; Checkfree, Cybercash Interact; New on the 'Net; EDS Joins the Cyber–Rush, Jul. 17, 1995, pp. 249–250.
AFX News, Microsoft, American Express Unit Sign Internet Payment System Agreement, Feb. 29, 1996, pp. 427.
Agence France Presse, Visa, Mastercard Announce Security Standard for Internet, Feb. 1, 1996, p. 85.
The American Banker, Vendors Ready—and Waiting—for E–Commerce, Feb. 2, 1996, pp. 47–50.
The American Banker, News Analysis: Despite Accord, Hard Work Ahead On Security Standard for Internet, Feb. 2, 1996, pp. 51–53.
The American Banker, Microsoft Signs Visa as a Processor; Pact Gives Banks Alternative to Intuit, Feb. 14, 1996, pp. 528–529.
The American Banker, Two New On–Line Alliances Pair Niche Leaders, Feb. 21, 1996, pp. 493–494.
The American Banker, News Analysis: Beware of Deals Like Verifone–Oracle, Banks Told, Feb. 27, 1996, pp. 443–445.
The American Banker, Amex Accepts SET Protocol On Internet, Mar. 1, 1996, pp. 382–383.
The American Banker, Encryption Software Firm Adopts On–Line Protocol, Mar. 14, 1996, p. 352.
The American Banker, Frontiers, Mar. 18, 1996, pp. 317–319.
The American Banker, Card Briefs: Novus Supporting SET Payment Protocol, Apr. 2, 1996, pp. 235.
The American Banker, If It Has To Do With Data Security, Changes Are This 'Little' Company Is In Involved, Apr. 15, 1996, pp. 156–160.
The American Banker, On the Question of Internet Security, A Three–Sided Debate, Apr. 15, 1996, pp. 161–165.
The American Banker, Web Security Firm To Add MC–Visa Protocol, Apr. 23, 1996, pp. 130–131.
The American Banker, Card Briefs: Icverify Internet Tools To Get SET Protocol, May 3, 1996, p. 53.
The American Banker, Mastercard Official Resigns To Lead Internet Security Firm, May 3, 1996, pp. 54–55.
American Marketplace, Visa–Mastercard Security Agreement: A Green Light For Online Commerce, Feb. 8, 1996, pp. 5–6.
Amusement Business, More 'Digital Homeless' Find Place in Cyberspace; Professionals Not Subscribing To An Online Computer Service, Feb. 12, 1996, pp. 536–537.
AP Online, Cable TV's Sci–Fei Channel, Jun. 9, 1995, pp. 259–261.
AP Online, Purchases On Net Studied, Jan. 31, 1996, pp. 171–172.
AP Online, AP Top News At 5 a.m. EST Thursday, Feb. 1, 1996, Feb. 1, 1996, pp. 86–88.
AP Online, AP Top News at 6 a.m. EST Thursday, Feb. 1, 1996, Feb. 1, 1996, pp. 89–91.
AP Online, AP Top News at 7 a.m. EST Thursday, Feb. 1, 1996, Feb. 1, 1996, pp. 92–94.
AP Online, AP Top News at 8 .m. EST Thursday, Feb. 1, 1996, Feb. 1, 1996, pp. 95–97.
AP Online, AP Top News at 9 a.m. EST Thursday, Feb. 1, 1996, Feb. 1, 1996, pp. 115–117.
AP Online, AP Financial News at 9:10 a.m. EST Thursday, Feb. 1, 1996, Feb. 1, 1996, pp. 118–122.
AP Online, AP Top News at 10 a.m. EST Thursday, Feb. 1, 1996, Feb. 1, 1996, pp. 125–127.
AP Online, Standard Found for Web Credit, Feb. 1, 1996, pp. 123–124.
AP Online, AP Financial News At 11:10 a.m. EST Thursday, Feb. 1, 1996, Feb. 1, 1996, pp. 107–110.
AP Online, AP Financial News At 3:10 p.m. EST Thursday, Feb. 1, 1996, Feb. 1, 1996, pp. 98–102.
AP Online, AP Financial News At 5:10 p.m. EST Thursday, Feb. 1, 1996, Feb. 1, 1996, pp. 103–106.
AP Online, AP Financial News at 5:20 p.m. EST Thursday, Feb. 1, 1996, Feb. 1, 1996, pp. 111–114.
AP Online, Amer Express Backs Rival Ides, Feb. 29, 1996, pp. 428–429.
AP Worldstream, Financial Pages, Feb. 1, 1996, pp. 128–129.
AP Worldstream, Financial Pages, Feb. 29, 1996, pp. 430–432.
AP Worldstream, A Summary of News From the U.S. Virgin Islands, May 25, 1995, pp. 265–268.
Asia, Inc., Internet Security, May 1996, pp. 64–66.
Asia, Inc., Internet Security, May 1996, pp. 67–69.
Asian Banker, Shopping On The Internet, Mar. 1996, pp. 384–388.
Asian Wall Street Journal, Fraud, Nosy Web Pages Torment Internet Users, Mar. 18, 1996, p. 320.
Asiaweek, Protocols, Cyber Security; How to Head Off the Hackers, Feb. 23, 1996, pp. 489–490.
Associated Press, Cable's Sci–Fi Channel Creates World Wide Web 'Home Page', Jun. 9, 1995, pp. 262–264.
Associated Press, Visa and MasterCard Lead Group to Make Credit Purchases Save on the Net, Jan. 31, 1996, pp. 173–174.
Associated Press, Visa, MasterCard Resolve Technical Differences Fo On–Line Credit Transactions, Feb. 1, 1996, pp. 130–131.
Associated Press, American Express Endorses Rivals' Ideal for Secure Online Credit, Feb. 29, 1996, pp. 433–434.
Associated Press, American Express Endorses Rivals' Idea for Secure Online Credit, Mar. 1, 1996, pp. 389–390.
Austin American–Statesman, Standard Proposed For Electronic Verification, Jul. 3, 1995, pp. 251–252.
Austin American–Statesman, Credit Cards to Get Internet Security; Visa, MasterCard Have Agreed On a Way to Scramble Card Numbers, Feb. 2, 1996, pp. 45–46.
Baltimore Sun, Sun Names Former Reporter to Lead Move Into Internet; Service Will Offer News and Adverstising, Jan. 31, 1996, pp. 175–176.
Banker, Banks Take Charge, Mar. 1996, pp. 396–399.
Banker, Product, Mar. 1996, pp. 400–403.

Banker, Technology, Banks Take Charge, Mar. 1996, pp. 391–394.

Banker, Visa and MasterCard Join Forces to Develop Standars, Mar. 1996, p. 395.

Banker, Credit Card Standards, Apr. 1996, p. 239.

Banking Policy Report, Visa and MasterCard Move to Safeguard Card Transactions On Internet, Mar. 4–18, 1996, pp. 370–371.

Bank Systems & Technology, First Union, Open Market Hit the Internet, May 1995, pp. 269–270.

Black Sun Interactive, 3D PointWorld, Downloading, PointWorld, Apr. 16, 1996, p. 1.

Business Journal–Portland, Taking the Plunge Into On–Line Sales, Feb. 9, 1996, pp. 2–4.

Business Times, SNS Online Service Confident of Success, Nov. 27, 1995, pp. 184–186.

Business Times, Opening Windows to Net Security, Mar. 6, 1996, pp. 362–363.

Business Times, Card, IT Leaders Make Shopping On The Net Safer, Apr. 2, 1996, p. 236.

Business Wire, MasterCard International Goes Live On the Internet; New MasterCard World Wide Web Site Home Page Combines Utility and Imagination, Mar. 27, 1995, pp. 294–296.

Business Wire, Adobe and Netscape to Bring Commercial Publishing to the Internet, Mar. 28, 1995, pp. 291–293.

Business Wire, Emerging U.S. Debit Market Attracts International Player, Jul. 27, 1995, pp. 244–245.

Business Wire, VeriSign Inc. to Provide Digital IDs for Open Market's Secure WebServer; Key Technology for Verifying the Identities of Parties in Electronic Commerce, Aug. 14, pp. 241–243.

Business Wire, ComNet '96 Explores Electronic Commerce; Business On The Internet the Focus of Many Conference Sessions, Jan. 4, 1996, pp. 181–183.

Business Wire, "Computer Within a Floppy Disk" Puts Secure Electronic Commerce In the Palm of Your Hand, Jan. 17, 1996, pp. 179–180.

Business Wire, RSA Data Security, Inc. Establishes Japanese Subsidiary Company to Market RSA Encryption Technology to Developers in Japan, Feb. 8, 1996, pp. 7–8.

Business Wire, VeriSign to Provide Digital ID Services for FTP Software's Esplanade (TM) Web Server for Windows NT; Alliance Will Ensure Secure Electronic Transactions for Users of New Web Servers, Feb. 12, 1996, pp. 538–540.

Business Wire, First Data and Netscape Offering Internet Payment Processing Service; New Service Available Now, Feb. 20, 1996, pp. 500–501.

Business Wire, RSA Announces Support for SET Payment Standard Across Entire Product Line; World's Most Popular Encryption Solution Provider Now Supports VISA/MasterCard Standard for Secure Payments Over the Internet, Mar. 4, 1996, pp. 372–373.

Business Wire, Certicom—Special Task Grup to Review Secure Electronic Transaction Protocol Developed by Visa and MasterCard—Sherry E. Shannon Appointed Chair of the New Task Group, Mar. 15, 1996, pp. 340–341.

Busness Wire, Panel of Electronic Commerce Expets to Reveal What Gates and McNealy Won't Tell you about Electronic Commerce—ICat Corp. Convenes Panel of Pioneers to Discuss the Ype and Reality at New York Trade Show, Mar. 26, 1996, pp. 289–290.

Business Wire, Major Faws Seen in Visa/Mastercard Security Plan for Internet Commerce; Network Security Expert Says RSA Encryption and Authentication Standard Leaves Consumers Vulnerable to Hackers, Apr. 16, 1996, pp. 154–155.

Business Wire; ICVERIFY to Incorporate SET Specification in its Software Solutions; SET Specification Provides Long Awaited Internet Security for Both Customers and Merchants, Apr. 26, 1996, pp. 125–126.

Business Wire, John Gould Joines Terisa Systms As Chief Executive Officer, Apr. 29, 1996, pp. 102–103.

Business Wire, IBM Leads Industry With Comprehensive Strategy, Technologies for Electronic Commerce; Electronic Shopping, Secure Transactions, May 1, 1996, pp. 70–75.

Business Wire, L.L. Bean Signs Up With IBM; IBM Announces New Products, Services that Make Internet Real for Business, May 1, 1996, pp. 76–80.

Business Wire, Electronic Commerce Just Got Real; NETCOM, Federal Express, Open Market and CheckFree Join iCat to Discuss Breakthrough Electronic Commerce Solution, May 2, 1996, pp. 59–61.

Calgary Herald, Visa and MasterCard Agree on Standard, Feb. 2, 1996, pp. 54–55.

Calgary Herald, 'Net Security Hinders Commerce, Apr. 4, 1996, pp. 228–229.

Canada Newswire, Attention Business/Technology Editors: Special Task Group to Review Secure Electronic Transaction Protocol Developed by Visa and MasterCard, Mar. 15, 1996, pp. 342–343.

CardFAX, A Joint Technical Standard for Security Credit Card Transactions, Feb. 5, 1996, pp. 28–30.

Card News, Security Advances May Improve, Not Perfetc, On–Line Transactions, Feb. 5, 1996, pp. 28–30.

Card News, AMEX, First Data Initiate On–Line Purchase Efforts, Mar. 4, 1996, pp. 374–375.

Card News, Card News Briefs: Discovery Joins Security Rush, Apr. 1, 1996, p. 240.

Card News, Cards on the Web Addressed, Apr. 29, 1996, pp. 104–105.

Cards International, VeriSign Secures Net Deals, Jul. 20, 1995, pp. 246–247.

Cards International, International: MC and Visa Co–Operate On Internet Specs, Feb. 14, 1996, 530–531.

Cards International, Amex Set to Support Security Specs, Mar. 12, 1996, pp. 356–357.

Charleston Gazette, Secure Internet Credit Code Unveiled, Feb. 2, 1996, pp. 57–59.

U.P.I., Checkfree Partnering With Cybercash, Jul. 19, 1995, p. 248.

Chicago Sun–Ties, Visa, MasterCard Agree on Online Security, Feb. 2, 1996, pp. 60–61.

Christian Science Monitor, Visa, MasterCard Tackle Internet Security, Feb. 2, 1996, p. 80.

Columbus Dispatch, Roving Bandits Make Buying Risky Business, Nov. 6, 1994, p. 312–313.

COMLINE Daily News from Korea, Mastercard, Visa Agree to a Single Security Standard, Feb. 7, 1996, p. 11.

Communications News, Business Banks Its Future On Electronic Commerce; Strategies Being Pursed for Secure Financial Transactions on the Internet; Netcomm Update; Industry Trend or EventCom, Apr. 1996, pp. 241–243.

CommunicationsWeek, MCI Offers Secure Transaction Service, Oct. 2, 1995, pp. 299–230.

CommunicationsWeek, In Brief; Charge It On the 'Net, Feb. 5, 1996, p. 31.

CommunicationsWeek, On–Line Payment Scheme Arrives, Feb. 26, 1996, pp. 456–458.

CommunicationsWeek, In Brief; Amex 'Set' For Internet, Mar. 4, 1996, p. 376.

CommunicationsWeek, Safety On the 'Net—Can Encryption Offer Peace of Mind to Nervous Network Managers, Mar. 25, 1996, pp. 299–303.

CommunicationsWeek, Tandem, VLSI Partner to Develop Security Chips for Commercial Use, Apr. 15, 1996, pp. 166–167.

CommunicationsWeek, Shop Till You Drop With the JEPI Standard, Apr. 22, 1996, pp. 134–135.

CommunicationsWeek, Terisa, to Add SET to Web Software, Apr. 29, 1996, pp. 106–107.

CommunicationsWeek, Netscape Adds Electronic–Commerce Apps, May 13, 1996, pp. 10–11.

CommunicationsWeek, Internet Security—A Moving Target, May 13, 1996, pp. 12–15.

Computer Conference Analysis Newsletter, UniForum; Conference on Unix and Open Systems With Focus On the Internet; Industry Trend or Event, Feb. 26, 1996, pp. 459–479.

Computer Connection, Telecomm Decence Act Draws Cheers, Jeers and Fears, Feb. 10, 1996, pp. 549–557.

Computer Connection, Internet Security Standards Agreement, Feb. 10, 1996, pp. 558–559.

Computergram International, Microsoft Confounded: Visa-–MasterCard Spec Free, Feb. 2, 1996, p. 62.

Computergram International, First Data, Netscape Jointly Deliver First Real–Time On–Line Credit, Apr. 11, 1996, p. 223.

Computer Reseller News, Systems Enters Channel With Security Products, Apr. 22, 1996, pp. 136–137.

Computer Shopper, AT& T Offes Low–Tech Protection for Internet: No–Deductible Insurance for Online Buyers, May, 1996, pp. 81–82.

Computer Technology Review, Digital Signatures Keep Cyberstreets Safe for Shoppers, Feb. 1996, pp. 132–134.

Computer Weekly, Web Takes the Credit; Visa, MasterCard Join Forces to Develop Secure Payment Systems for Electronic Commerce; Company Business and Marketing, Feb. 8, 1996, pp. 9–10.

Computerworld, News Shorts, Feb. 5, 1996, pp. 32–33.

Computerworld, Microsoft Provides Rapid Net Deployment Ability, Mar. 18, 1996, pp. 321–323.

Computerworld, Briefs, Mar. 18, 1996, p. 324.

Computerworld, Predictions, Apr. 29, 1996, pp. 108–110.

Computerworld, Credit–Card Authorization Set For Net, May 13, 1996, pp. 16–17.

Corporate EFT Report, MasterCard, Visa to Combine Internet Security Standards, Feb. 7, 1996, pp. 12–13.

Corporate EFT Report, Products Could Spur On–Line Transactions, Mar. 6, 1996, pp. 364–365.

Corporate EFT Report, Amex Eyes Internet Security, Mar. 6, 1996, p. 366.

Corporate EFT Report, Corporate EFT Report News Briefs, Apr. 3, 1996, pp. 230–231.

Credit Cared Management, Internet Commerce Gets A Boost, Mar. 1996, pp. 404–405.

Credit Card News, Electronic Commerce Gets a Boost, Feb. 15, 1996, pp. 526–527.

Daily Mail, Now Spending Cuts Are On the Cards; Money Mail, Feb. 7, 1996, pp. 14–15.

Daily Telegraph, Card Guard Makes It Safer to Cybershop, Feb. 2, 1996, p. 63.

Daily Telegraph, Innovations: Codes to Beat the Criminal Internet, Feb. 13, 1996, pp. 534–535.

Datamation, Microsoft Plays Internet Catch–U. Microsoft & the Enterprise: I–Nets; Company Business and Marketing; Cover Story, Mar. 15, 1996, pp. 344–348.

Des Moines Register, Safe Shopping On–Line; Card Associations Agree On Internet Security, Feb. 17, 1996, pp. 520–522.

Digital Media, Turning the Page; MCI Switches From News Corp to the Microsoft Network; Letter; Company Business and Marketing Column, Mar. 12, 1996, pp. 358–360.

Discount Merchandiser, Secure Electronic Transactions, Mar. 1996, pp. 406–407.

DM News, Open Market Offers Internet Security; Clients Can Get On the World Wide Web For Less Than $1,000, Apr. 3, 1995, pp. 281–282.

DM News, Mainstream Alternative For Advertisers; Business Wants to be Visible; Cybercitizens Want to Buy, Feb. 12, 1996, pp. 543–545.

DM News, Canadian Big Guns Set Sights On Skittish Cybershioppers; St. Remy Multimedia, Cogco Cable in Quadruple Play, Feb. 19, 1996, pp. 506–508.

DM News, IBM's Commercial Online Service Will Build DBs, Track Spending, Feb. 19, 1996, pp. 509–510.

Denver Post, On–Line Car Dealer Rings Up 57 Sales In Four Months, Feb. 10, 1995, pp. 229–300.

dot.COM, Internet Data's Payment Service, Mar. 1, 1996, p. 408.

Edge: Work–Group Computing Report, Digital ID: Verisign Inc. to Provide Digital IDS For Open Market's Secure Webserver; Key Technology For Verifying the Identities of Parties In Electronic Commerce, Aug. 21, 1995, pp. 236–237.

Edge: Work–Group Computing Report, E–Commerce: IBM Leads Industry With Comprehensive Strategy, Technologies for Electronic Commerce; Electronic Shopping, Secure Transactions, May 6, 1996, pp. 48–52.

EDI News, MasterCard, Visa to Combine Internet Security Standards, Feb. 19, 1996, pp. 511–512.

EDP Weekly, Visa, MasterCard Announce Single Technical Standard to Safeguard Payment Card Purchases on Internet, Feb. 12, 1996, p. 546.

EDP Weekly, American Express To License Microsoft Software To Help Secure Transactions Via Internet, Mar. 11, 1996, p. 361.

EDP Weekly, ANSI Committee Creates Special Task Group to Review Secure Electronic Transaction Protocol, Mar. 25, 1996, p. 304.

EDP Weekly, Network Security Expert Notes Major Flaws in Visa/MasterCard Security Plan, Apr. 22, 1996, p. 140.

EFT Report, Service Variety Seen Key to Home Banking's Future, Mar. 29, 1995, pp. 288–290.

EFT Report, MasterCard, Visa to Combine Internet Security Standards, Feb. 14, 1996, pp. 532–533.

Electronic Buyers' News, EC Providers Take On Security—Visa, MC Announce Transaction Standard; GE Intros B–to–B Solution, Feb. 12, 1996, pp. 547–548.

Electronic Buyers' News, SET Controversy Flares Up—Insiders Debate Integrity Of Proposed Standard, Apr. 29, 1996, pp. 113–115.

Electronic Engineering Times, Credit–Card Firms Agree On Security, Feb. 5, 1996, p. 34.

Electronic Engineering Times, E–Cash Coming? Bank On It, Feb. 19, 1996, pp. 513–516.

Electronic Engineering Times, Secure Internet Transactions Seen, Feb. 26, 1996, pp. 480–481.
Electronic Engineering Times, Copyright Protection Moves Into Digital Age, Mar. 18, 1996, pp. 325–327.
Electronic Engineering Times, Form Factors Figures Into Security Debate, Apr. 29, 1996, pp. 111–112.
Electronic Marketplace Report, Visa, MasterCard Announce Standard for Securing Internet Transactions, Feb. 6, 1996, pp. 17–18.
Electronic Messaging News, Visa, MasterCard Combine Standards, Feb. 7, 1996, p. 482.
Electronic Messaging News, MasterCard, Visa In Internet Pact, Feb. 26, 1996, p. 482.
Electronic Payments International, Ingenico Buys Innovation Data Systems, Mar. 1996, pp. 409–410.
Electronic Payments International, Getting All SET For On–Line Commerce, Mar. 1996, pp. 411–412.
Electronic Payments International, The Growing Impact of the Internet, Mar. 1996, pp. 413–415.
Electronic Payments International, Telefonica Makes the Right Calls Before SET, Apr. 1996, pp. 244–245.
Electronic Payments International, Consortium Explores Internet Payments, Apr. 1996, pp. 246–247.
Electronic Payments International, Telefonica Makes the Right Calls Before SET, Apr. 1996, pp. 248–249.
Electronic Payments International, Consortium Explores Internet Payments, Apr. 1996, pp. 250–251.
Exchange, Novell Expands Networked Application and Electronic Commerce Offerings, Mar. 22, 1996, pp. 315–316.
Extel Examiner, Microsoft, American Express Unit Sign Internet Payment System, Feb. 29, 1996, p. 435.
FDCH Political Transcripts, The National Consumers League Holds a News Conference on Combatting Fraud on the Internet; Washington, D.C., Feb. 27, 1996, pp. 446–455.
Federal Document Clearing House Congressional Testimony, Testimony Oct. 17, 1995 Eugene Ludwig Comptroller Office of the Comptroller of the Currence House Banking Financial Institutions and Consumer Credit Bank Consolidation and Interstate Mega–Mergers, Oct. 17, 1995, pp. 214–226.
Federal News Service, Prepared Testimony of Eugene A. Ludwig Controller of the Currency Before the House Committee on Banking and Financial Services Subcommittee on Financial Institutions, Oct. 17, 1995, pp. 195–205.
Federal News Service, Prepared Statement of Joel S. Lisker Senior Vice President, Security and Risk Management Mastercard International Incorporated Before the House Committee on Banking and Financial Services, Apr. 15, 1996, pp. 168–172.
Federal News Service, Hearing of the House Banking and Financial Services Committee, Apr. 15, 1996, pp. 173–216.
Financial Post, Reaching Out on the Electronic Highway, Mar. 14, 1996, pp. 353–355.
Financial Post, Race on to Come Up With Web Payment System, Apr. 27, 1996, pp. 122–124.
Financial Times, Credit Card Groups to Co–Operate on Internet Security, Feb. 2, 1996, p. 64.
Fresno Bee, Credit Firms Set Internet Security Code, Feb. 2, 1996, p. 65.
Gazette (Montreal), Digital Sermon Packs 'Em In: 1,100 From Business World listen Raptly to Technoguru's Generalities, Apr. 18, 1996, pp. 149–151.
Gazette (Montreal), Bell Global Has High Hopes for Business Network, Apr. 19, 1996, pp. 147–148.
Houston Chronicle, Firms Back Cyberspace Verification System, Jun. 26, 1995, pp. 253–256.
Houston Chronicle, Firms Back Cyberspace Veficication System, Jun. 26, 1995, pp. 255–256.
Independent, In Brief: Amex and Microsoft Sign Internet Deal, Mar. 1, 1996, p. 416.
Industry Week, Move Over China, Caught In the Web, May 1, 1995, p. 271.
Information & Interactive Services Report, Microsoft, Wal–Mart Pact Aims for Online Bargain–Hunters, Feb. 23, 1996, pp. 491–492.
InformationWeek, Intranet Tools, E–Mail on the Net to Debut—Major Announcements Expected at Internet World, Electronic Messaging Assocaition Conferences, Apr. 22, 1996, pp. 142–143.
InformationWeek, Cisco Places $4 Billion Network Bet—StrataCom Buy Seen Extending ATM, Tying Switching and Routing, Apr. 29, 1996, pp. 116–117.
InformationWeek, Netscape's Corporate Push Grows—CompuServe Tie–In Puts Groupware on Internet, May 13, 1996, p. 27.
Information Week, In Short; Terisa Names CEO, May 13, 1996, p. 29.
InfoWorld, National Semiconductor's PersonaCard; Card Holds Key to On–Line Security, Nov. 14, 1994, pp. 310–311.
InfoWorld, Standards; Adapt or Die; Internet Standards May Always Be In Flux, Nov. 6, 1995, pp. 187–192.
InfoWorld, At Deadline, Feb. 5, 1996, pp. 35–36.
InfoWorld, RSA Sale May Improve Security, Apr. 22, 1996, p. 144.
InfoWorld, Pipeline, Apr. 22, 1996, p. 145.
Infoworld, Internet Servers; Netscape Antes Up for Commerce, May 13, 1996, pp. 30–31.
5InfoWorld, IBM, HP Preview 'Net Products Aimed On–Line Commerce, May 13, 1996, p. 33.
InfoWorld, Web Page Authoring Tool; Internet Creator Builds Sites One Paragraph at a Time; No Need to Master HTML; Tool Enables On–Line Commerce, May 13, 1996, pp. 35–37.
InformationWeek, Europe, Oct. 2, 1995, pp. 231–234.
Interactive Daily, 4. Cyberspace Security Bolstered by Pact, Feb. 2, 1996, p. 68.
Interactive Daily, 5. Microsoft Allies With American Express, Mar. 1, 1996, p. 417.
Interactive Marketing News, Mastercard and Visa Reach Agreement on Security Protocols, Feb. 16, 1996, pp. 523–524.
International Herald Tribune, A Giant Leap for Credit Cards? System to Protect Payments on Internet is Unveiled, Feb. 2, 1996, pp. 66–67.
Investor's Business Daily, The Electronic Wallet: Secure Payment Methods Sought for Internet, Dec. 8, 1994, pp. 305–307.
Investor's Business Daily, CEO Briefing; A4, Mar. 28, 1996, pp. 285–286.
Korea Economic Daily, Mastercard, Visa Agree to a Single Security Standard, Feb. 6, 1996, p. 19.
Los Angeles Times, The Cutting Edge: Special Report/Hot Tips; What's Coming, When, and Whey It's a Big Deal; Next Year could Bring Start of On–Line Profits, Dec. 18, 1994, pp. 303–304.
Los Angeles Times, Technology, Feb. 1, 1996, p. 139.

M2 Presswire, Adobe and Netscape to bring Commercial Publishing to the Internet (C) 1994–95 M2 Communications Ltd, Mar. 31, 1995, pp. 283–285.

M2 Presswire, Verisign, Inc: VeriSign Inc. to Provide Digital IDs for Open Market's Secure WebServer, Aug. 16, 1995, pp. 238–240.

M2 Presswire, Rednet: EDI for the Apple Macintosh and Power PC, Oct. 24, 1995, pp. 193–194.

M2 Presswire, Visa Intl: Security Specifications for Card Transactions on Internet Combined into One Standard, Feb. 1, 1996, pp. 140–141.

MS Presswire, First Data: FD and Netscape Offering Internet Payment Processing Service New Service Available Now, Feb. 21, 1996, pp. 495–496.

M2 Presswire, Visa: Visa and MasterCard Welcom American Express to Their Internet Payment System, Mar. 1, 1996, pp. 418–419.

M2 Presswire, Credit Card Research Group: Cards to Make a Clean Sweep of the Cybermarket, Mar. 1, 1996, pp. 420–421.

M2 Presswire, Racal Airtech: Racal Supports the Visa/MasterCard Secure Electronics Transactions, (SET) Specification, May 2, 1996, pp. 62–63.

Media Daily, Microsoft, Visa Announce Specification to Secure Payments, Sep. 27, 1995, p. 235.

Media Daily, Mastercard and Visa Agree on Online Security Standard, Feb. 1, 1996, pp. 136.

Media Daily, Netscape Launches Payment System, May 13, 1996, p. 38.

Report on Microsoft, News Briefs: Visa and Mastercard, Apr. 22, 1996, p. 146.

Midrange Systems, GEIS Aims to Stimulate EDI Growth, Mar. 15, 1996, pp. 349–350.

Milwaukee Journal Sentinel, U.S. Postal Service to Enter Electronic Age, Mar. 4, 1996, pp. 379–380.

Multimedia & Videodisc Monitor, Tools & Technology: Mastercard, Visa Agree on Encryption Technology, Mar. 1, 1996, p. 422.

Multimedia Week, Industry Briefs: Encryption, Feb. 5, 1996, p. 39.

Nation's Restaurant News, Amex, Microsoft Seal Security Agreement. American Express Travel Related Services Co. Signs Licensing Agreement With Microsoft Corp., Brief Article, Mar. 18, 1996, p. 328.

Nave Research group, Navigating and Acting in Virtual Environments, May 16, 1996, pp. 1–9.

Network Briefing, Visa & Mastercard Agree E–Payment Spec, Feb. 16, 1996, p. 525.

Network Computing, More Than One Way to Skin A Coded Cat, Mar. 15, 1996, p. 351.

Network World, Wells Fargo Hops Aboard 'Net Wagon, Feb. 6, 1995, pp. 301–302.

Network World, An Insecure Feeling Haunts the Net, Feb. 12, 1996, pp. 541–542.

Network World, Wal–Mart to Lure Electronic Shoppers With Web Retail Store, Feb. 19, 1996, pp. 504–505.

Network World, New Briefs, Mar. 4, 1996, pp. 377–378.

Network World, Security Specification Is Full of Holes, Critics Charge, Apr. 22, 1996, pp. 138–139.

Network World, ActiveX Pioneer Pushes Commerce, May 6, 1996, pp. 46–47.

Network World, Ready, SET, Go; American Express, MasterCard, and Visa Throw Their Combined Weight Behind the SET Payment Protocol for the Web; Merchants May Face a Learning Curve, May 13, 1996, pp. 18–23.

Network World, Effort Aims to Unit 'Net Payment Schemes, May 13, 1996, p. 24.

Network World, Netscape Unveils New 'Net Commerce Offerings, May 13, 1996, pp. 25–26.

News, Credit Card Fraud New Concern of Internet Business, Mar. 16, 1996, pp. 329–330.

Newsbytes News Network, France—Bull Forms Smart Card Subsidiary Apr. 13, 1995, Apr. 13, 1995, pp. 274–275.

Newsbytes News Network, Open Market Intros "Secure" Web Storefront Oct. 17, 1995, Oct. 17, 1995, pp. 206–207.

Newsbytes News Network, Newsbytes Daily Summary Oct. 17, 1995, Oct. 17, 1995, pp. 208–213.

Newsbytes News Network, Commerce Direct Offers Secure Electronic Transactions Jan. 22, 1996, Jan. 22, 1996, pp. 177–178.

Newsbytes News Network, ****Visa, Mastercard Combine Internet Security Standards Feb. 2, 1996, Feb. 2, 1996, pp. 71–72.

Newsbytes News Network, GTE's CyberTrust For Web Electronic Commerce Feb. 6, 1996, Feb. 6, 1996, pp. 20–21.

Newsbytes News Network, AT&T WorldNet Spurs Online Credit Use Feb. 6, 1996, Feb. 6, 1996, pp. 22–23.

Newsbytes News Network, Open Market, Interleaf Team On Web "Secure Doc Mgt" Mar. 5, 1996, Mar. 5, 1996, pp. 367–369.

Newsbytes, Web Marketplace—Online Security Agreement Almost Here Apr. 10, 1996, Apr. 10, 1996, pp. 224–225.

News Tribune, Business Briefly, Feb. 2, 1996, pp. 69–70.

New York Times, A New Standard is Proposed for Electronic Verification, Jun. 26, 1995, pp. 257–258.

New York Times, Plan to Guard Credit Safety on Internet, Feb. 1, 1996, pp. 142–143.

New York Times, Jan. 28–Feb. 3; Attention, Cyber–Shoppers!, Feb. 4, 1996, p. 40.

New York Times, Diary, Feb. 4, 1996, pp. 41–43.

Nightly Business Report, Feb. 1, 1996, pp. 144–154.

Nightly Business Report, Feb. 1, 1996, pp. 150–154.

Orange County Register, Life on the Line; Credit Where Credit is Due, Mar. 31, 1996, pp. 283–284.

Orange County Register, Bits and Pieces, Apr. 7, 1996, pp. 226–227.

PC Magazine, MasterCard and Visa Join Forces for Net Commerce; To Develop the Secure Electronic Transactions Technical Standard for Protecting Credit Card Purchases Made Over the Internet; Technology Information; Brief Article, Mar. 26, 1996, pp. 291–292.

PC Magazine, Skinny Client to Rule on Web; Corporate Intranets Will Fuel a New Breed of Applications; Industry Trend or Event; Brief Article, Mar. 26, 1996, pp. 293–294.

PC Magazine, MasterCard and Visa Join Forces for Net Commerce, Mar. 26, 1996, pp. 295–296.

PC Magazine, Skinny Clients to Rule on Web, Mar. 26, 1996, pp. 297–298.

PC Magazine, Digital Bucks? Stop Here; Electronic Commerce Services; The Web at War: The Battle for the Future of the Internet; Company Business and Marketing, May 28, 1996, pp. 2–5.

PC Magazine, Digital Bucks? Stop Here, May 28, 1996, pp. 6–9.

PC User, Shortlist; News Briefs, Feb. 21, 1996, pp. 497–499.

PC Week, Briefly Notes; News Briefs; Brief Article, Feb. 5, 1996, pp. 37–38.

PC Week, AT&T Ramps Up Internet Commerce, Access to WorldNet Service; Company Business and Marketing; Brief Article, Feb. 19, 1996, p. 517.

PC Week, Big Player; Deals to Speed Net Commerce; Netscape, Oracle, HP Cut Agreements for Credit–Card Systems, Security; Industry Trend or Event, Feb. 26, 1996, pp. 483–484.

PC Week, Microsoft Reposition MSN; Microsoft Network to Offer new Services; Online Service Information; Brief Article, Feb. 26, 1996, pp. 485–486.

PC Week, Microsoft Reposition MSN, Feb. 26, 1996, pp. 487–488.

PC Week, Briefly Notes; News Brief; Brief Article, Mar. 4, 1996, p. 381.

PC Week, New Security Protocol Spurs Internet Took Kits; Secure Electronic Transaction, Industry Trend or Event, Apr. 15, 1996, pp. 217–218.

PC Week, New Security Protocol Spurs Internet Took Kits, Apr. 15, 1996, pp. 219–220.

PC Week, IBM Takes Charge of E–Commerce: Plans Client, Server Apps Based on SET; NetCommerce Electronic Commerce System; Product Announcement, Apr. 29, 1996, pp. 118–119.

PC Week, IBM Takes Charge of E–Commerce; Plans Client, Server Apps Based on SET, Apr. 29, 1996, pp. 120–121.

Portland Press Herald, L.L. Bean to Offer Ordering By Internet; It's a Bold Move for a Firm That's Usually Slow to Adopt New Technology, May 2, 1996, pp. 56–58.

PR Newswire, Bank One Joins Commercenet, Oct. 17, 1994, pp. 314–315.

PR Newswire, Rudolph Beware MCI to Offer Cyber–Santas a Faster Route to the Mall Via Mouse; MarketplaceMCI Opens Door to 25 Million New Customers; Integrated Software Package Assures Secure Electronic Transactions, Nov. 22, 1996, pp. 308–309.

PR Newswire, Microsfot Corp. Chooses Software.Net (TM) to be First to Electronically Deliver Microsoft Software; Software.Net to Electronically Market Over Microsoft Products Via the Internet, Oct. 17, 1995, pp. 227–228.

PR Newswire, Visa and MasterCard Combine Security Specifications for Card Transactions on the Internet into One Standard; Move Expected to Accelerate Development of Electronic Commerce and Bolster Consumer Confidence in the Security o f Cyberspace Transactions, Feb. 1, 1996, pp. 155–156.

PR Newswire, SAIC is £Yourservice for Secure Electronic Transaction on the Internet, Feb. 29, 1996, pp. 436–437.

PR Newswire, American Express Signs Licensing Agreement With Microsoft to Make Secure Purchases Over the Internet, Feb. 29, 1996, pp. 438–439.

PR Newswire, Visa and Mastercard Welcom American Express, Feb. 29, 1996, pp. 440–441.

PR Newswire, Centura Announces the Next Step in Online Money Management, Apr. 15, 1996, pp. 221–222.

PR Newswire, Industry Security Leader Racal Supports Visa/Mastercard Proposal for Internet, Apr. 17, 1996, pp. 152–153.

PR Newswire, Spyglass(TM) Supports Microsoft's ACTIVEX, SET, PCT and ISAPI With Introduction of New Spyglass Web Technology Kits, Apr. 23, 1996, pp. 132–133.

PR Newswire, Cybersource's New Internet Commerce Services Provide Software Publishers Turn–Key Electronic Transaction and Distribution Services; Qualcomm, Insignia, Wall Data and Seven Other Publishers Choose CyberSource to Distribute Products Via the Internet, Apr. 30, 1996, pp. 99–101.

PR Newswire, 1996 Olympic Games Web Site Proves a Successful as Venue for Olympic Ticket Sales; IBM–Developed Server Enables Secure Electronic Transactions for a Large Number of Consumers, May 1, 1996, pp. 83–84.

PR Newswire, Dynamic Duo Taxware and IBM; Partners on the Commerce.Net, May 1, 1996, pp. 85–86.

PR Newswire, DocuMagix Hotpage Available Now Online Via Software.Net; Software.Net Offers DocuMagix HotPage with Exclusive Custom Content, May 7, 1996, pp. 44–45.

PR Newswire, Netscape Announces Netscape Livepayment (TM) to Facilitate Internet Commerce; Leading Companies to Support Netscape's Open, Cross–Platform Software for Online Credit Card Processing, May 13, 1996, pp. 39–41.

Record, Security is Going on Line; Mastercard, Visa Agree on Standard, Feb. 2, 1996, pp. 73–75.

Reuters, Bank One Corp <One.N> Says Joins Commercenet, Oct. 17, 1994, p. 316.

Reuters, MasterCard, Visa to set Electronic Standard NYT, Feb. 1, 1996, p. 160.

Reuters, Visa and Mastercard Adopt Joint Internet Standard, Feb. 1, 1996, pp. 164–165.

Reuters, GE<GE.N> Info Services Debuts net Commerce Systems, Feb. 6, 1996, pp. 24–25.

Reuters, AMEX <AXP.N>, Microsoft <MSFT.O> In Pact, Feb. 29, 1996, p. 442.

Reuters, Netscape<NSCP.O> Offers Secure Internet Collection, May 13, 1996, p. 42.

Reuter Business Report, America Online, Others Push for Net Security, Apr. 11, 1995, pp. 276–277.

Reuter Business Report, Visa and Mastercard Adopt Joint Internet Standard, Feb. 1, 1996, pp. 158–159.

Reuter Business Report, Mastercard, Visa to Set Electronic Standard NYT, Feb. 1, 1996, p. 157.

Reuter Business Report, Improving Internet Safety to Protect Commerce, Apr. 3, 1996, pp. 232–234.

Reuter European Business Report, America Online, Others Push for Net Security, Apr. 11, 1995, pp. 278–279.

Reuter European Business Report, Mastercard, Visa to set Electronic Standard—NYT, Feb. 1, 1996, p. 161.

Reuter European Business Report, Visa and Mastercard Adopt Joint Internet Standard, Feb. 1, 1996, pp. 162–163.

Reuters World Service, MasterCard, Visa to Set Electronic Standard—NYT, Feb. 1, 1996, p. 169.

Risk Management, Are You Exposed on the Internet? Security Issues and Data Protection; Circuit Breakers, Apr. 1996, pp. 252–254.

Rocky Mountain News, Visa, MasterCard Agree on 'Net Security; Deal Allows to Offer Customers Greater Protection in On Line Services, Feb. 2, 1996, pp. 76–77.

Rocky Mountain News, The Web: It's Anybody's Business; Colorado Retailers and Service Companies Caught Up in Awesome Potential of Internet, Mar. 24, 1996, pp. 305–310.

Sacramento Bee, Credit Card Standard Set for Net, Feb. 23, 1996, pp. 78–79.

The San Diego Union–Tribune, Business; Ed. 1,2,3,4,5,6,7, 8; p. C–2, Mar. 1, 1996, pp. 423–424.

The San Francisco Chronicle, Mastercard, Visa Accord on Internet Credit–Card Giants Agree on a Security Standard, Feb. 1, 1996, pp. 137–138.

The San Francisco Examiner, Credit–Card Companies OK Internet Security Deal, Feb. 1, 1996, pp. 166–167.

The San Francisco Examiner, Infobahn leads to a Volvo Dealer, Mar. 1, 1996, pp. 297–298.

Seybold Report on Desktop Punlicshjing, Visa, MasterCard Adopt SET, Feb. 19, 1996, pp. 518–519.

South China Morning Post, Business; Banking; p. 7, Mar. 30, 1995, pp. 286–287.

Standard & Poor's Emerging & Special Situation, New Issues—Cybercash Avoid, Feb. 20, 1996, pp. 502–503.

The Straits Times (Singapore), Larger NetworkAsia Show This Year, Apr. 25, 1996, pp. 272–273.

The Straits Times (Singapore), Credit Card Firms Devise Joint Net Payment Scheme, Feb. 2, 1996, p. 81.

The Straits Times (Singapore), Music Scene Alive and Thriving Since the '30s, Feb. 6, 1996, pp. 26–27.

The Straits Times (Singapore), Concern Grows Over Credit Card Debts, Mar. 24, 1996, pp. 311–314.

Sunday Times, Credit Card Set Standard for Net Buys, Feb. 4, 1996, p. 44.

Telecomworldwide, Global Players Unite on Payment Standards, Feb. 1, 1996, p. 168.

Telecomworldwide, Sidewire: Science Applications International Corp, a US Provider of Information and Network, Mar. 1, 1996, p. 425.

Telecomworldwide, Adobe, Netscpate Form Major Commercial Internet Publishing Plan, Apr. 14, 1995, p. 280.

The Toronto Star, Firm Unveils Secure Net Paying System, Mar. 27, 1996, pp. 287–288.

Origin Universal New Services Limited, Racal Supports the Visa/Mastercard Secure Electronics Transactions (SET), May 1, 1996, pp. 87–88.

Upside, The Cyber Bowl, Apr. 1996, pp. 255–266.

Upside, The Key to Security, Apr. 1996, pp. 267–276.

Upside, End of the Line for On–Line Services?, May 1996, pp. 89–98.

U.S. Banker, Card Pact Weaves a Tighter Net, Mar. 1996, p. 426.

Wall Street Journal, Visa, Mastercard Reach an Agreement for Single System of Internet Payment, Feb. 1, 1996, p. 170.

The Washington Post, Feb. 2, 1996, pp. 83–84.

The Washington Post, Give Us Some Credit: Your Card is Safe; There Are Many Very Good Reasons Not to Shop On–Line. Fear That Your Credit Card Number Will be Abused Should Not Be One of Them, Apr. 24, 1996.

The Washington Post, Who Was That Masked Cybershopper?; MasterCard–Visa Agreement on Credit Card Security May Make On–Line Commerce Fly, Feb. 2, 1996, p. 82.

Working Woman, Adventure On–Line . . . ; Using Online Services to Make Travel Arrangements, Apr. 1996, pp. 277–282.

Your Money, Brokers Not Equal When It comes to Charging Customers, Mar. 16, 1996, pp. 331–337.

Your Money, Credit Card Fraud New Concern of Internet Business, Mar. 16, 1996, pp. 338–339.

Borenstein et al., MIME (Multipurpose Internet Mail Extensions) Part One: Mechanisms for Specifying and Describing the Format of Internet Message Bodies, Borenstein & Freed, Sep. 1993.

Fielding et al., Hypertext Transfer Protocol—HTTP/1.1, Fielding, Frystyk, Berners–Lee, Gettys and Mogul, May 2, 1996.

Fielding et al., Hypertext Transfer Protocol—HTTP/1.1, Fielding, Frystyk, Bernets–Lee, Gettys and Mogul, Jun. 3, 1996.

An RSA Laboratories Technical Note, Version 1.5, Revised Nov. 1, 1993.

Internet Protocol, DARPA Internet Program Protocol Specification, University of Southern California, Sep. 1981.

Transmission Control Protocol, DARPA Internet Program Protocol Specification, University of Southern California, Sep. 1981.

Warr, Michael. "Business Wants Telecom of the Future—Today," Telephony's SUPERCOMM Wrap–up, pp. 12–3. Apr. 1991.

Müller, R., "Lon–Das Universelle Netzwerk, Teil 1." Elektronik., vol. 40, No. 22, Oct. 29, 1991, Munchen De, pp. 59–69, XP000268228.

Snow, C.R. et al: "Simple Authentication" Software Practice & Experience., vol. 24, No. 5, May 1994, Chichester GB, pp. 437–447, XP0006555455, p. 440–441.

Stallings, W. "Data and Computer Communications", 1994, MacMillan Publishing Co., New York, US, XP002069639, pp. 636–644, 663–666.

Anderson, R. et al. "NetCard—a Practical Electronic–cash System." International Workshop Proceedings, Security Protocols. International Workshop, Cambridge, UK, Apr. 10–12. p. 49. XP00203977.

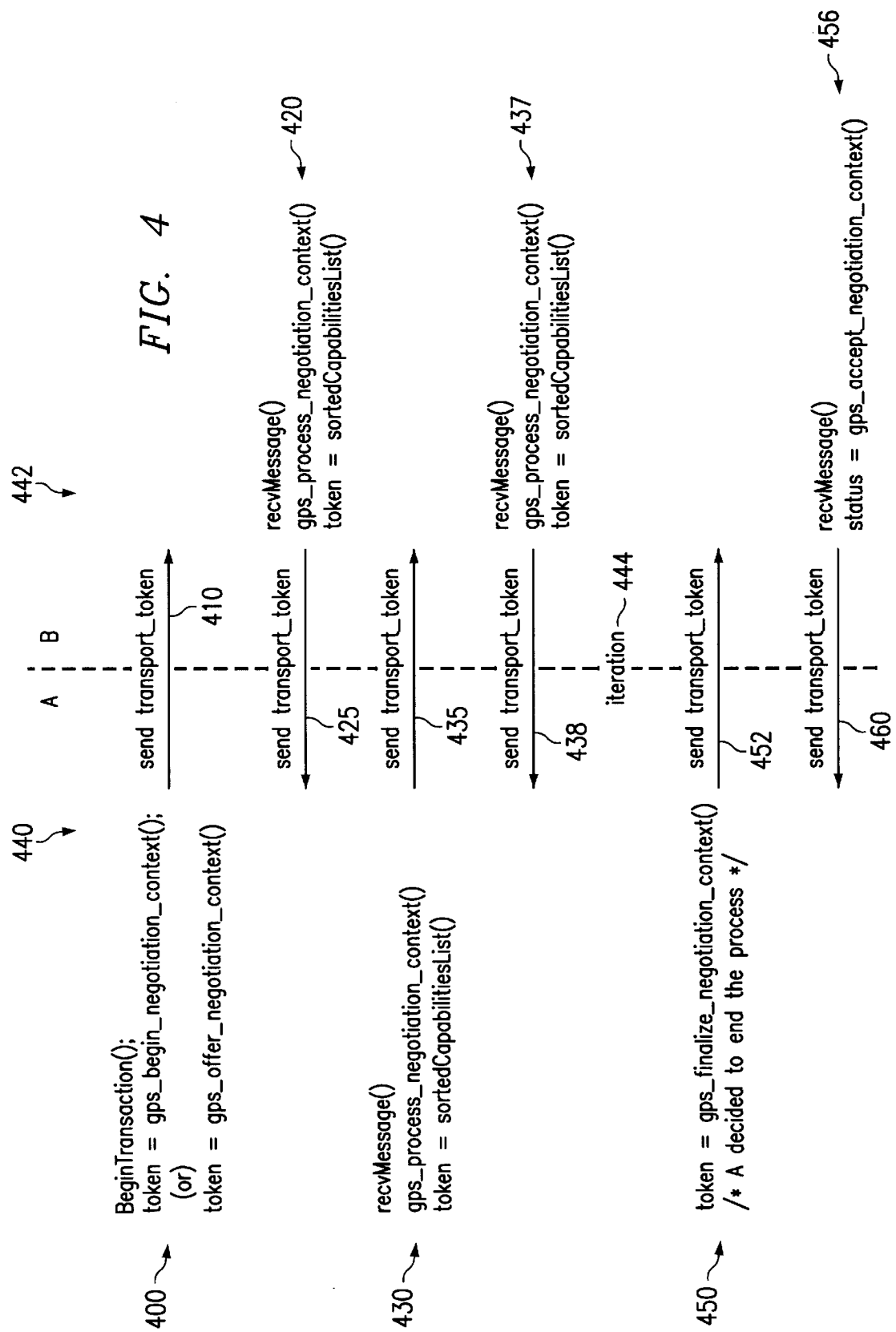

SYSTEM, METHOD AND ARTICLE OF MANUFACTURE FOR DYNAMIC NEGOTIATION OF A NETWORK PAYMENT FRAMEWORK

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

The present invention relates to the secure, electronic payment in exchange for goods and services purchased over a communication network, and more specifically, to a system, method and article of manufacture for securely transmitting payment information utilizing a negotiated, mutually acceptable payment processing method from a customer to a merchant utilizing a network.

The present invention relates to an electronic representation of a monetary system for implementing electronic money payments as an alternative medium of economic exchange to cash, checks, credit and debit cards, and electronic funds transfer. The Electronic-Monetary System is a hybrid of currency, check, card payment systems, and electronic funds transfer systems, possessing many of the benefits of these systems with few of their limitations. The system utilizes electronic representations of money, such as credit cards, which are designed to be universally accepted and exchanged as economic value by subscribers of the monetary system.

Today, approximately 350 billion coin and currency transactions occur between individuals and institutions every year. The extensive use of coin and currency transactions has limited the automation of individual transactions such as purchases, fares, and bank account deposits and withdrawals. Individual cash transactions are burdened by the need to have the correct amount of cash or providing change. Furthermore, the handling and managing of paper cash and coins are inconvenient, costly and time consuming for both individuals and financial institutions.

Although checks may be written for any specific amount up to the amount available in the account, checks have very limited transferability and must be supplied from a physical inventory. Paper-based checking systems do not offer sufficient relief from the limitations of cash transactions, sharing many of the inconveniences of handling currency while adding the inherent delays associated with processing checks. To this end, economic exchange has striven for greater convenience at a lower cost, while also seeking improved security.

Automation has achieved some of these qualities for large transactions through computerized electronic funds transfer ("EFT") systems. Electronic funds transfer is essentially a process of value exchange achieved through the banking system's centralized computer transactions. EFT services are a transfer of payments utilizing electronic "checks," which are used primarily by large commercial organizations.

The Clearing House (ACH) where a user can enter a pre-authorized code and download information with billing occurring later, and a Point Of Sale (POS) system where a transaction is processed by connecting with a central computer for authorization for the transaction granted or denied immediately are examples of EFT systems that are utilized by retail and commercial organizations. However, the payments made through these types of EFT systems are limited in that they cannot be performed without the banking system. Moreover, ACH transactions usually cannot be performed during off business hours.

Home Banking bill payment services are examples of an EFT system used by individuals to make payments from a home computer. Currently, home banking initiatives have found few customers. Of the banks that have offered services for payments, account transfers and information over the telephone lines using personal computers, less than one percent of the bank's customers are using the service. One reason that Home Banking has not been a successful product is because the customer cannot deposit and withdraw money as needed in this type of system.

Current EFT systems, credit cards, or debit cards, which are used in conjunction with an on-line system to transfer money between accounts, such as between the account of a merchant and that of a customer, cannot satisfy the need for an automated transaction system providing an ergonomic interface. Examples of EFT systems that provide non-ergonomic interfaces are disclosed in U.S. Pat. Nos. 5,476,259; 5,459,304; 5,452,352; 5,448,045; 5,478,993; 5,455,407; 5,453,601; 5,465,291; and 5,485,510.

To implement an automated, convenient transaction that can dispense some form of economic value, there has been a trend towards off-line payments. For example, numerous ideas have been proposed for some form of "electronic money" that can be used in cashless payment transactions as alternatives to the traditional currency and check types of payment systems. See U.S. Pat. No. 4,977,595, entitled "METHOD AND APPARATUS FOR IMPLEMENTING ELECTRONIC CASH," and U.S. Pat. No. 4,305,059, entitled "MODULAR FUNDS TRANSFER SYSTEM."

The more well known techniques include magnetic stripe cards purchased for a given amount and from which a prepaid value can be deducted for specific purposes. Upon exhaustion of the economic value, the cards are thrown away. Other examples include memory cards or so called smart cards which are capable of repetitively storing information representing value that is likewise deducted for specific purposes.

It is desirable for a computer operated under the control of a merchant to obtain information offered by a customer and transmitted by a computer operating under the control of the customer over a publicly accessible packet-switched network (e.g., the Internet) to the computer operating under the control of the merchant, without risking the exposure of the information to interception by third parties that have access to the network, and to assure that the information is from an authentic source. It is further desirable for the payment processing to be flexible and able to negotiate with the client customer to select a mutually acceptable payment protocol and other payment options.

One such attempt to provide a secure transmission channel is a secure payment technology known as the Secure Electronic Transaction (hereinafter "SET"), jointly developed by the Visa and MasterCard card associations, and described in Visa and MasterCard's *Secure Electronic Transaction (SET) Specification,* Feb. 23, 1996, hereby incorporated by reference. Other such secure payment technologies include Secure Transaction Technology ("SIT"), Secure Electronic Payments Protocol ("SEPP"), Internet Keyed Payments ("iKP"), Net Trust, and Cybercash Credit Payment Protocol. One of ordinary skill in the art readily comprehends that any of the secure payment technologies can be substituted for the SET protocol without undue experimentation.

Such secure payment technologies require the customer to operate software that is compliant with the secure payment technology, interacting with third-party certification authorities, thereby allowing the customer to transmit encoded information to a merchant, some of which may be decoded by the merchant, and some which can be decoded only by a payment gateway specified by the customer.

Another such attempt to provide such a secure transmission channel is a general-purpose secure communication protocol such as Netscape, Inc.'s Secure Sockets Layer (hereinafter "SSL") , as described in Freier, Karlton & Kocher (hereinafter "Freier"), *The SSL Protocol Version 3.0*, March 1996, and hereby incorporated by reference. SSL provides a means for secure transmission between two computers. SSL has the advantage that it does not require special-purpose software to be installed on the customer's computer because it is already incorporated into widely available software that many people utilize as their standard Internet access medium, and does not require that the customer interact with any third-party certification authority. Instead, the support for SSL may be incorporated into software already in use by the customer, e.g., the Netscape Navigator World Wide Web browsing tool. However, although a computer on an SSL connection may initiate a second SSL connection to another computer, a drawback to the SSL approach is each SSL connection supports only a two-computer connection. Therefore, SSL does not provide a mechanism for transmitting encoded information to a merchant for retransmission to a payment gateway such that a subset of the information is readable to the payment gateway but not to the merchant. Although SSL allows for robustly secure two-party data transmission, it does not meet the ultimate need of the electronic commerce market for robustly secure three-party data transmission. Other examples of general-purpose secure communication protocols include Private Communications Technology ("PCT") from Microsoft, Inc., Secure Hyper-Text Transport Protocol ("SHTTP") from Theresa Systems, Shen, Kerberos, Photuris, Pretty Good Privacy ("PGP") and Ipv6 which meets the IPSEC criteria. One of ordinary skill in the art readily comprehends that any of the general-purpose secure communication protocols can be substituted for the SSL transmission protocol without undue experimentation.

Banks desire an internet payment solution that emulates existing Point of Sale (POS) applications that are currently installed on their host computers, and require minimal changes to their host systems. This is a critical requirement since any downtime for a bank's host computer system represents an enormous expense. Currently, a preferred embodiment supports over fourteen hundred different payment-related applications. The large number of applications is necessary to accommodate a wide variety of host message formats, diverse methods for communicating to a variety of hosts with different dialup and direct-connect schemes, and different certification around the world. In addition, there are a wide variety of business processes that dictate how a Point of Sale (POS) terminal queries a user for data and subsequently displays the data. Also, various vertical market segments, such as hotels, car rental agencies, restaurants, retail sales, mail sales/telephone sales require interfaces for different types of data to be entered, and provide different discount rates to merchants for complying with various data types. Moreover, merchants that banking organizations work with utilize a plethora of report generation mechanisms and formats.

Banks are unwilling to converge on "standards" since convergence would facilitate switching from one acquiring bank to another by merchants. In general, banks desire to increase the cost that a merchant incurs in switching from one acquiring bank to another acquiring bank. This is accomplished by supplying a merchant with a terminal that only communicates utilizing the bank's proprietary protocol, and by providing other value-added services that a merchant may not be able to obtain at another bank.

Internet-based payment solutions require additional security measures that are not found in conventional POS terminals. This additional requirement is necessitated because internet communication is done over publicly-accessible, unsecured communication line in stark contrast to the private, secure, dedicated phone or leased line service utilized between a traditional merchant and an acquiring bank. Thus, it is critical that any solution utilizing the internet for a communication backbone, employ some form of cryptography.

As discussed above, the current state-of-the-art in internet based payment processing is a protocol referred to as SET. Since the SET messages are uniform across all implementations, banks cannot differentiate themselves in any reasonable way. Also, since SET is not a proper superset of all protocols utilized today, there are bank protocols which cannot be mapped or translated into SET because they require data elements for which SET has no placeholder. Further, SET only handles the message types directly related to authorizing and capturing credit card transactions and adjustments to these authorizations or captures. In a typical POS terminal in the physical world, these messages comprise almost the entire volume of the total number of messages between the merchant and the authorizing bank, but only half of the total number of different message types. These message types, which are used infrequently, but which are critical to the operation of the POS terminal must be supported for proper transaction processing.

One of the challenges of implementing electronic payments in the real world is the wide variety of payment options available. One effort to address this was the Joint Electronic Payments Initiative (JEPI). JEPI was sponsored by the World Wide Web consortium (W3C) and CommerceNet. JEPI's stated goal was to provide a universal payment platform to allow merchants and consumers to transact business over the Internet. JEPI allows clients and server to exchange some payment instruments utilizing a few protocols and transports as described in a paper entitled, "Selecting Payment Mechanisms Over HITP." A copy of this paper is available on the Internet at:

[http://www.w3.org/pub/WWW/Payments/JEPI/UPPFlow.html].

JEPI consists of two parts: PEP, an extension to HTTP developed by W3C

[http://www.w3.org/pub/WWW/TR/WD-http-pep-960222.html]

and UPP, a payment protocol. The result was a syntax for exchanging information about payment processing but it lacked the flexibility and extendibility of a modular, object-oriented payment architecture. PEP is one of a variety of protocols that can be utilized by the preferred embodiment to format messages containing objects for transmittal between a client and a server.

Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associates with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual :pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX could be substituted for JAVA without undue experimentation to practice the invention.

SUMMARY OF THE INVENTION

The foregoing problems are overcome in an illustrative embodiment of the invention in a network computing environment in which a plurality of clients are connected to one or more merchants to conduct commerce over the network. When a client initiates a connection with a merchant, the merchant responds to the request for connection by transmitting one or more messages back to the client to determine a mutually acceptable payment processing method. This process entails a negotiation to determine a suitable payment instrument, a payment protocol and standard message formats for conducting the electronic commerce. The payment protocol comprises a message format, a protocol associated with the message format and a weight associated with each of the items associated with the payment processing methods. The weight is provided by both the client and the merchant to facilitate dynamic negotiation of a mutually acceptable method for processing payments. The negotiation results in the exchange of standard message formats that the client and the merchant are equipped to process efficiently and securely.

BRIEF DESCRIPTION OF THE DRAWINGS

The above and further advantages of the invention may be better understood by referring to the following description in conjunction with the accompanying drawings, in which:

FIG. 4 is a transaction logic diagram detailing an electronic payment negotiation in accordance with a preferred embodiment.

DETAILED DESCRIPTION

The invention is preferably practiced in the context of a program resident on a computer such as a SUN, IBM, HP, or a Windows NT computer. The application utilizes a browser such as Netscape, Internet Explorer or America OnLine (AOL) to access, send and receive messages to and from the Internet.

Figure 1:
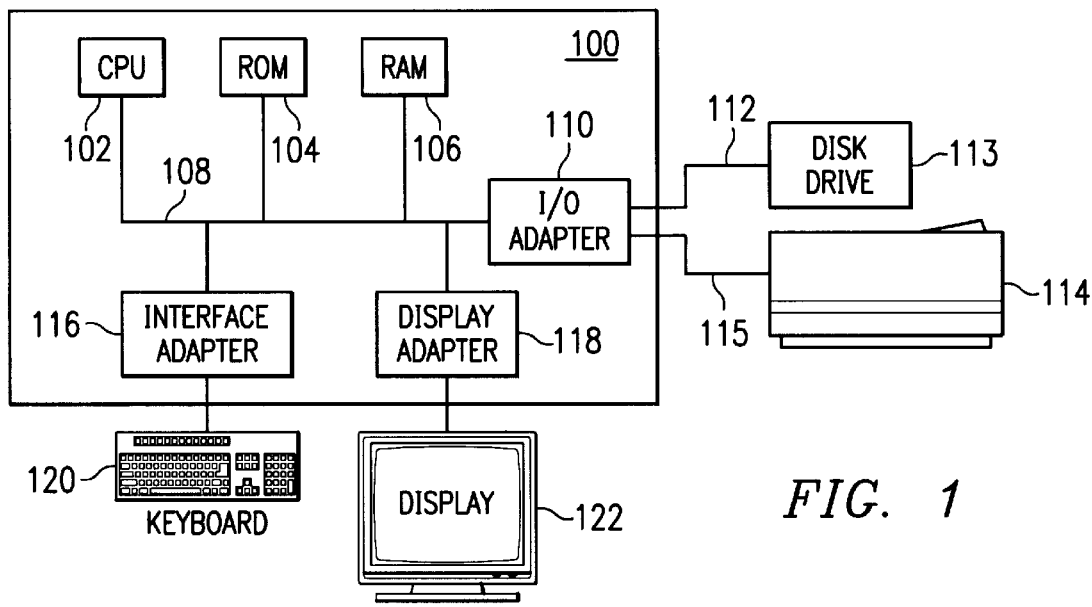
FIG. 1 is a block schematic diagram of a computer system for example, a personal computer system on which the inventive object oriented information manager operates.

A representative hardware environment is depicted in FIG. 1, which illustrates a typical hardware configuration of a computer 100 in accordance with the subject invention. The computer 100 is controlled by a central processing unit 102 (which may be a conventional microprocessor) and a number of other units, all interconnected via a system bus 108, are provided to accomplish specific tasks. Although a particular computer may only have some of the units illustrated in FIG. 1, or may have additional components not shown, most merchant (server) computers will include at least the units shown.

Specifically, computer 100 shown in FIG. 1 includes a random access memory (RAM) 106 for temporary storage of information, a read only memory (ROM) 104 for permanent storage of the computer's configuration and basic operating commands and an input/output (I/O) adapter 110 for connecting peripheral or network devices such as a disk unit 113 and printer 114 to the bus 108, via peripheral bus 112 or cables 115, respectively. A user interface adapter 116 is also provided for connecting input devices, such as a keyboard 120, and other known interface devices including mice, speakers and microphones to the bus 108. A display adapter 118 which connects the bus 108 to a display device 122, such as a video monitor provides visual output. The computer has resident thereon and is controlled and coordinated by operating system software such as the SUN Solaris, Windows NT or JavaOS operating system.

Figure 2:
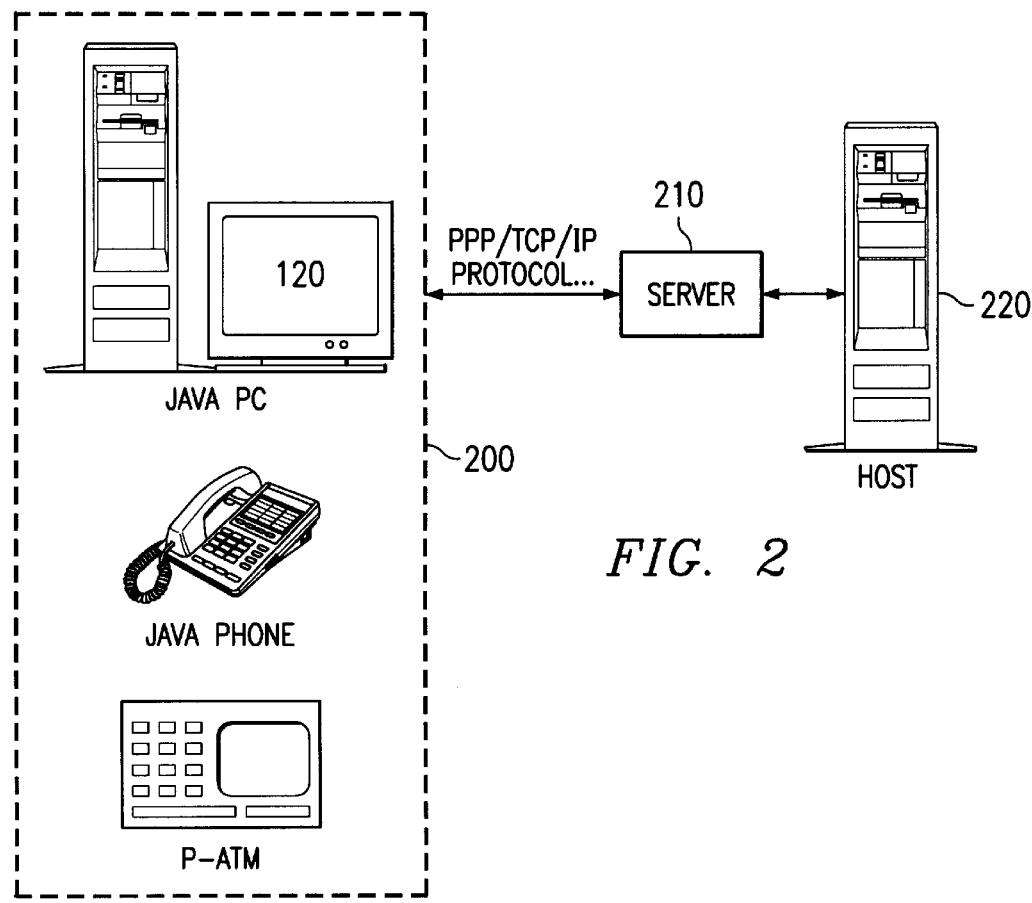
FIG. 2 is a block diagram of a merchant (server) in accordance with a preferred embodiment.

FIG. 2 illustrates a client-merchant network in accordance with a preferred embodiment. A set of consumer devices (client terminals 200) are attached to a merchant (server) 210 and the merchant is attached to a legacy host 220 to process applications requiring information at the host 220. The connection could be by means of the Internet, a dialup link, token ring, cellular phone, satellite, T1 or X.25 telco link or other communication means.

Merchant Software

The merchant (sever) software is written using a combination of Java, C or possibly C++. C or C++ will be used mainly to implement platform dependent code (such as dealing with the communication ports). While a preferred embodiment discloses support for a dialup network and Internet processing utilizing TCP/IP, one of ordinary skill in the art will readily realize that a token ring, SNA or other network, such as those discussed in U.S. Pat. Nos. 5,530, 961; 5,491,796; 5,457,797; 5,442,791; 5,430,863; 5,394, 401; 5,291,597; 5,287,537; 5,287,461; 5,201,049; 4,991, 089; and 4,588,211 could be readily interchanged as the network.

Today, there are multiple payment mechanisms utilizing the Internet to communicate and direct information to a payment manager for integrating a customer and an associated merchant with applications for processing financial transactions. Potential overhead can be associated with transactions employing the Internet, since applications may need to negotiate for performance every-time a new payment application is utilized. A payment processing method negotiation service that minimizes this overhead is disclosed, which enables communicating peers to select a particular, common payment mechanism. A preferred embodiment utilizes a modular approach that divides the payment mechanism into smaller, sub-problems and defines object-based solutions comprised of frameworks for each of the modular problems.

Each framework is transport independent and supports a variety of data-flow models. Therefore, any application developer trying to implement electronic commerce is able to accommodate this supporting framework in their protocols. The API is modular and extensible and is designed to be interoperable with a wide range of payment systems. The payment processing method negotiation service is part of the Generic Payment Services in accordance with a preferred embodiment.

Introduction

The existence of multiple payment mechanisms over the Internet continues to pose challenges to electronic merchandising and retailing systems. It has become necessary for both the customer and the merchant to integrate each of the methods individually with their application. In addition, they may need to perform this integration each time that a newer method is introduced. In order to eliminate the overhead associated with a plurality of payment mechanisms, a payment processing method negotiation service was developed in accordance with a preferred embodiment. During the payment negotiation process, the buying and the selling agents exchange a sequence of query and accept/reject/confirm messages with or without the user's intervention. The result of the exchange of messages is an agreement on a particular payment processing method that is utilized for a particular transaction or a series of transactions.

There are several decisions to be made by the applications during a transaction before the actual payment process begins. The decisions include determining a payment processing method, payment capability, payment protocol, payment account and a payment instrument that is acceptable to both parties. A payment processing method can be automatically negotiated if preferences are set appropriately to sort methods in order. For example, the users' preference might be to use a credit card first, if accepted, before using cash. If preferences are not set, then users may need to manually sort payment processing methods in order during the negotiation process.

Payment capability and payment protocol can be automatically negotiated, based on the availability of payment capability and payment protocol and preference information entered by individual merchants and clients. Payment account and payment instrument preference information must be preset to facilitate automatic negotiation. Otherwise, a user's advice at the time of payment may be utilized to select between multiple accounts and instruments. For instance, users might prefer paying with MasterCard instead of Visa for a particular charge (note that both of these instruments use the same payment protocol). In another case, a merchant may accept only electronic checks and not ATM cards, even though they might access the same account.

Terminology

In this section, we present the definitions of some of the terminology we use consistently throughout this application in accordance with a preferred embodiment.

Payment Processing Methods

Refers to the name used to categorize the type of electronic payments. Some methods include Credit Card, Debit Card, Electronic Check, Micro-payments, and Electronic Cash.

Payment Protocol

Refers to the messages used to carry payment-related information and instructions between the parties involved and the flow and/or sequence of those messages. Known electronic payment protocols include the SET protocol.

Payment Mechanism or System

Refers to a complete system designed to facilitate payment transactions amongst parties. Examples of such mechanisms include solutions requiring third party intermediaries such as a NetBill.

Payment Service Provider

Refers to the party operating a Payment System or Mechanism.

Payment Capability

The ability to use a payment system is provided by payment capabilities to the application. The nature of the implementation can vary (e.g. from being an applet to a shared library or even a plug-in application). The end result, however, remains to consistently enable an application interface to a payment system.

Payment Service

Refers to a function or module used during a payment transaction. There are five major payment services identified in accordance with a preferred embodiment. They are Payment Interface Management, Method Negotiation, Preference Management, Capability Management, and Transaction Management.

Account and Account Proxy

An account is where value is stored. Alternatively an account provides its owner with the privilege to use a system maintaining the account. In the online world, there may be new types of accounts with analogous purposes to those found in the current physical world. An account proxy, however, is the online representation of an account in the physical world. The information in the account can be cached in the account proxy (e.g. the running balance). However, the account proxy's data is not necessarily up to date. One can close or destroy an online account, and an account proxy. However, physical accounts cannot be destroyed in a pure online fashion and would require other mechanisms.

Payment Instrument

The token utilized to provide payment. For example, a particular Visa card with an account number and an expiration date.

Requirements And Objective

The message format and the exchange model selected for payment negotiation process must address many fundamental business and technical issues, before they can become widespread.

Interface With Policy Management Of The Interface Agent

The participating parties may have conflicting interests. Payment Negotiation must present a policy-neutral interface which is consistent with other parts of an application. Selection and admission of a wide range of policies is preferable, both for the customers and the merchants. Merchants may enforce precise policy terms on services and customers may choose the terms they are willing to accept based upon their abilities and preference.

Negotiation Intentions

The message format and the protocol used for specifying payment negotiation supports various types and degrees of negotiation intentions to arbitrary levels of granularity. For example, it allows either party to specify their acceptance/confirmation of payment options provided, and it allows the parties to specify the strength of preference of their options.

Transport Independence

The model used for specifying negotiation intentions is independent of the transport mechanism and the media employed in transactions. This device facilitates the negotiation mechanism utilized in various applications. Furthermore, the protocol and the message format is performed over on-line as well as store-and-forward transports. The protocol must support various requirements specific to transport routes (e.g. the protocol may be carried through proxies and intermediary servers).

Standardization

The payment negotiation solution must provide standardization of high-level message formats used in the process and provide plug-ins for smooth transition into a wide range of payment mechanisms. Also, to achieve interoperability of client/merchant implementations that require an electronic protocol payment negotiation mechanism, the negotiation protocol must be standardized.

Expansion and Interoperability

The message format and the protocol must include short and long term strategies for service implementation, including expansion and interoperability, forecasts of demands and effects of these together.

Designation in the GPS API

The definition of payment negotiation mechanism must provide well-defined interfaces for other modules in the generic payment services API.

Method Negotiation Framework

Functionality

The negotiation is a process for determining the common payment processing methods, protocol, mechanism, capability, service provider, and account or account proxy to use to make a payment. The negotiation could occur just prior to a payment or at any time as an inquiry into the peers' capabilities. The Method Negotiation (MN) service is primarily used during the Inquiry and Payment phases. Unlike in the Payment phase, if the negotiation occurs in the Inquiry phase, the result is not immediately used. In either case, peer-to-peer communication is required. Therefore, the communication context is maintained by each peer. Communication is performed using tokens that indicate the parties' intentions during each exchange.

During a transaction, upon receiving a message specifying negotiation intentions, the application is directed to deliver that piece of information to the Payment Negotiation Module. The specialized IOProcessor strips off the information other than the negotiation token and creates a new object of class NegotiationToken. The payment negotiation manager extracts the list of payment capabilities from the context, discards the ones which are rejected by the sender and gets a list of capabilities available from the Capability Management module. Then, for every applicable method in the input list of capabilities, a locally available payment plug-in is activated, to enumerate and identify the constraints using that capability. The results are aggregated and added in the result payment capability list. Depending upon the status specified in the input request message, i.e. Payment required at this Stage, Payment Processing Methods specification options at this stage etc., single or multiple payment mechanisms are presented. Status codes are shown to the user, indicating the process flow, error/recovery etc.

Information other than the payment information, for e.g. Profile information will also be taken care of, if the preferences direct to do so. For instance, one of the parties involved in the negotiation might need the residence country of the other to decide on a payment mechanism.

Resources

The payment negotiator uses the preference information from the preference manager and the capability options from the capability manager, for its operation. The negotiation context is saved in the context repository, with the TransactionID as the key. This can also be used as a cache to store results of negotiation with a particular party, so that the same set of negotiation messages need not be repeated for the next business transaction.

Relationship to the GPS model

Figure 3:
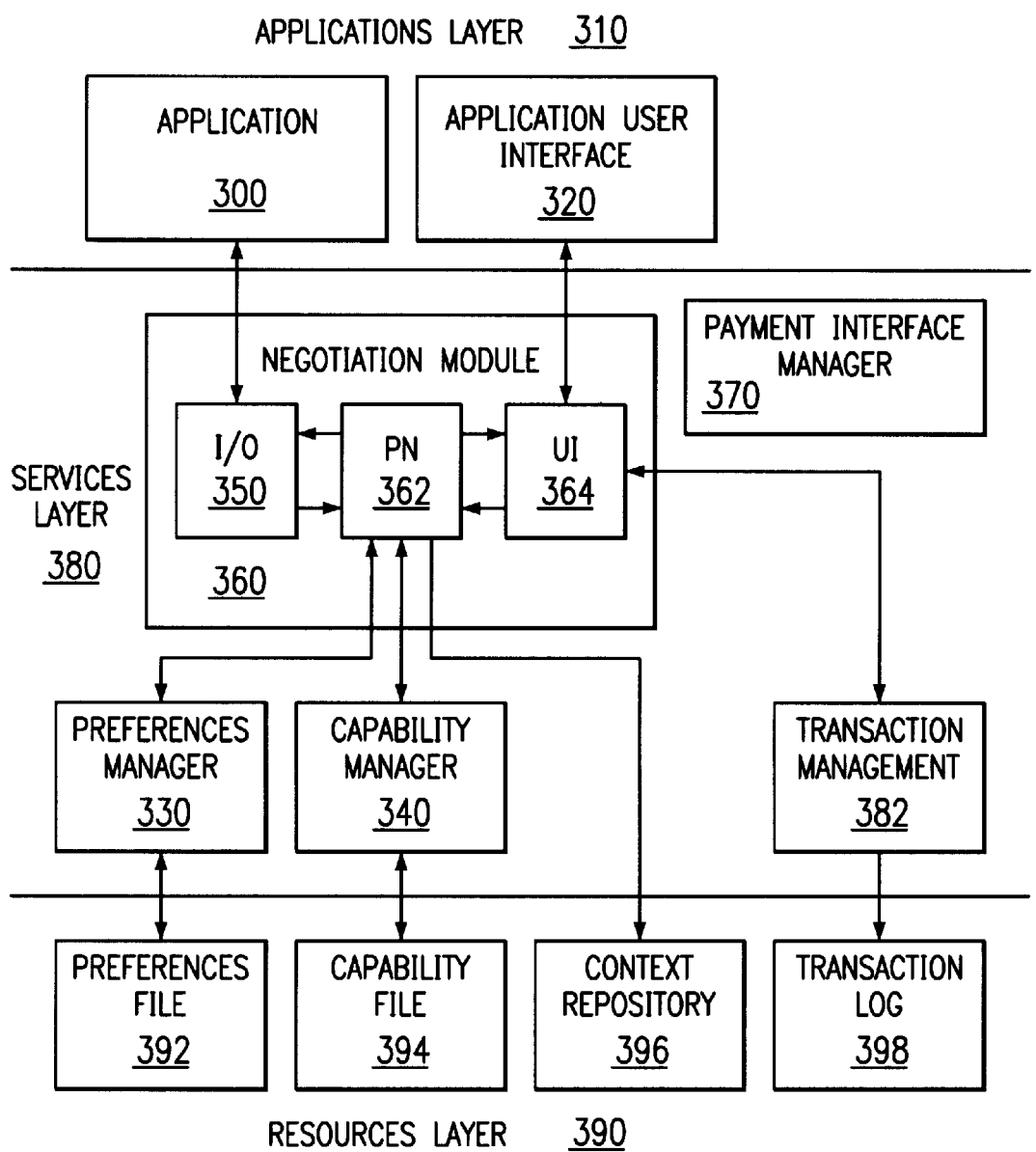
FIG. 3 is a detailed block diagram of the negotiation framework system components and how they relate to other modules in the GPS framework in accordance with a preferred embodiment.

FIG. 3 is a detailed block diagram of the negotiation framework system components and how they relate to other modules in the GPS framework in accordance with a preferred embodiment. This follows a symmetric design principal, where both the server and the client in the negotiation process follow the same model. The input message to the negotiation module contains a negotiation token is wrapped in transport specific information. The IOProcessor 350 converts the wrapped negotiation token into a negotiation token which is utilized by the payment negotiation framework 362. The negotiation manager object 360 utilizes the payment negotiation framework logic 362 to process it based on information from the context repository 396, utilizing directions given by the preference manager 330 and as per the availability of options from the capability manager 340 which also manages a capability file 394. It may also need input from the user, in which case, an application level window 300, 310, 320 is activated to indicate the status to the user and/or respond to input. Output from the negotiation manager 360 is passed onto the IOProcessor 350, where the token wrapped with transport specific information and delivered to the application for transmission. Individual transaction messages and operations may be logged 398 by the transaction manager 382 for later use in tracing and audit trails.

Programming Interface

This section is an introduction to the payment negotiation framework 362. It describes the classes designed to be used for this purpose, the data-types created to allow dynamic components and the interfaces that facilitate plug-ins.

Data Types

The payment negotiation module uses a list of data-types specific to it, which help in maintaining the negotiation state including:

NegotiationContext (396)

Objects of this type contain data about the buyer/seller profile information, details of the transaction, lists of associated payment capabilities, their acceptance information and any additional payment related information.

NegotiationToken

This object contains negotiation information and information about stages in payment negotiation process. This information travels on the wire between the two parties participating in the process. Only the peers at the negotiation level know how to process it. Additional data types are defined to hold and operate on transaction details, payment amount information, and party profile information as detailed below.

Data-types used in the Negotiation API

```
class NegotiationContext {

• Buyer/Seller PartyProfile
• TransactionDetails
• Payment Capability List
• Additional Payment Information
}
/*************************************************************/
class NegotiationToken {

• Token Type
• Negotiation Status Code
• TransactionDetails
• transacting PartyProfile
• Payment Capability List
• Additional Payment Information
}
/*************************************************************/
class PartyProfile {

• name and identification details
• affiliation
• residence country
• personal information
• other relevant information
}
/*************************************************************/
class TransactionDetails {

• TransactionID
• AmountDetails
• Business Information
• Miscellaneous parameters
}
/*************************************************************/
class NegotiationsSatus {
• TransactionID
• Acceptance/Rejection/Confirmation/Finalization code
• Other relevant info
}
```

Processing

The payment negotiation module 362 is a framework that is implemented and installed over the Inernet at both the client and the server sites. From a structural perspective, it consists of the following components that are presented in pseudocode with a written description of their function.

| Pseudo Code for Classes and Functions in GPS Method Negotiation |
|---|

```
/***********************************************************************/
/** Abstract class that can be made specialized for any of the application that employs
** Payment Negotiation Model
**/
abstract class IOProcessor {

/*
* Data-types which need to be converted
*/
NegotiationToken token;

/* should be implemented by subclasses for format conversion */
public abstract ExternalDataType to ExternalForm();
public abstract NegotiationToken to InternalForm();

}
/***********************************************************************/
/** Main Negotiator Object which does most of the negotiation work;
**
**/
public class PaymentNegotiator {
public NegotiationToken gps_begin_negotiation_context();
public NegotiationToken gps_offer_negotiation_context() {

/** get a list of capabilities, sort them and offer them to the transacting party **/
CapabilityList list = CapabilityManager.getDefaultCapabilities();
PreferenceManger.sortCapabilities(list);
NegotiationToken default_token = updateCapabilities(list);
gps_create_negotiation_context();
return default_token;

}
public NegotiationToken gps_process_negotiation_context(NegotiationToken c) {
NegotiationToken result_token;

/** Extract and register details of the business counterpart **/
PartyProfile p = extractPartyDetails(c);

/** get the list of available capability list from the sender **/
CapabilityList capability_list = extractCapabilityList(c);

/**get the corresponding context **/
NegotiationContext current_context = extractContext(c);
/** validate the input capability list by analyzing our constraints **/
StatusCode status_code = CapabilityManager.validate(capability_list);

/* error is represented as a signal, but it can be extended to include muitiple forms of error handling
methods **/
if(status_code notEqualTo OK) signal NegotiationError(status_code);
else {
/**
* take care of preference information - Call preference manager
*/
PreferenceManager.sort_capabilities(capability_list);

/** If necessary identify the most suitable one as per users discretion, providing the current context
**/
if(necessary) {
result_token = NegotiationUserInterface.GetUserHelp(current_context);
}
/** aggregate results **/
result_token = GetChosenCapabilities(current_context);

/** update context info at the database **/
gps_update_negotiation_context(c, result_token);

return result_token;
} public NegotiationToken gps_finalize_negotiation_context(NegotiationToken c) {

NegotiationContext context = extractContext(c);
    CapabiliiyList clist = extractCapabilityList(c);
    StatusCode status_code = CapabilityManager.validate(clist);
if(status_code notEqualTo OK) signal NegotiationError(status_code);
NegotiationToken token = GetChosenCapabilities(context);
addFinalizationMessage(token);
```

-continued

Pseudo Code for Classes and Functions in GPS Method Negotiation

```
    return token;
} public NegotiationToken gps_accept_negotiation_context(NegotiationToken c) {
NegotiationStatus status = CapabilityManager.verify( c);
if(status = OK) then return success_token;
NegotiationUserInterface.displayMessage(status);
    /** return the problem type embedded in a token **/
return NegotiationToken(status);

}

/** method to generate an output token, based up on the existing context and input token
** signals an error in case of inability to process
**/
private NegotiationToken GetChosenCapabilities(NegotiationContext context, NegotiationToken t)
signals NegotiationError;

private void addFinalizationMessage(NegotiationToken token);

/** Database functions which are used to access and update existing negotiation contexts **/
private void gps_create_negotiation_context();
private void gps_update_negotiation_context(NegotiationContext c, NegotiationToken t);
private void gps_delete_negotiation_context(NegotiationContext c)

/** Utility functions
**/
private PartyProfile extractPartyProfile(NegotiationToken c);
private CapabilityList extractCapabilityList(NegotiationToken c);
private NegotiationContext extractContext(NegotiationToken c);

}
/*************************************************************/
/** interface for the applications to have the user respond in difficult situations, when the
** Payment Negotiator cannot take decision of its own.
**/
public interface NegotiationUserInterface {
public void GetUserHelp(NegotiationContext c):
public CapabilityList GetOrderedList(CapabilityList list):
public CapabilityList GetChoices(CapabilityList list):
public PaymentCapability select(CapabilityList list):
public PaymentCapability finalize(CapabilityList list):
public PaymentCapability fillDetails(PaymentCapability pc):
public void displayMessage();

/** Display list functions to allow a provision of combination of methods described above **/
public void createDisplayList():
public void addToDisplayList(DisplayItem d):
public void realizeDisplayList():
}
/*************************************************************/
```

I/O Processor (350)

This class defines the interface with the application using the payment negotiation framework. The functionality includes receiving input headers from the transacting party, format conversion and embedding negotiation intentions in outgoing messages. This is an abstract class, which can be subclassed to work with different protocols.

Functions needed from the IOProcessor include:

toExtenalForm converts the input token into a message suitable for sending to a remote agent toInternalForm converts the input message into a NegotiationToken, suitable for processing Example Illustration: I/O Processor in the HTTP protocol domain using Protocol Extension Protocol[PEP], must process labels Protocol: and Protocol-Request: and convert them into NegotiationToken Objects and vice versa. Input to the HttpIOProcessor(sub-classed from the generic abstract IOProcessor) employed in a HTTP/PEP combined environment is a set of header labels, such as:

Protocol-Request: {Bags {Bag-A, Bag-B, Bag-C} in PEP syntax}

Protocol: {Bags {Bag-1, Bag-2} in PEP syntax} and the output would be a NegotiationToken, representing the negotiation inputs {Bag-A} {Bag-B} {Bag-C} and {Bag-1} {Bag-2}, which will be processed by the negotiation manager object. Similar data conversion happens when the input is a negotiation token. It is converted into a PEP Header to be embedded in the HTTP message.

Payment Negotiation Manager Object: (PaymentVegotiator—362)

The high level programmable object which is responsible for understanding the input negotiation request tokens and generates responses. Context is stored with an appropriate handler in the context database. When a NegotiationToken is fed as input to the negotiation manager, it performs a series of steps listed below.

1. obtains the corresponding context from the database; if there is none, create a new context and assign it the handler from token;
2. receives list of capabilities from the current context 396 and token;
3. validates the list with the help of Capability Manager 340 functions;
4. determines user's preferences with the help of Preference Manager 330 functions;
5. prompts the user, in case of difficulty proceeding with existing negotiation situation; and
6. creates an output token as a result of this processing, representing negotiation intentions of the user.

Functionality of this NegotiationToken object is split into these major sub-functions:

gps_begin_negotiation_context

To begin the negotiation conversation, the application calls this function to create the initial negotiation context that could be null. A negotiation token is generated, which may not contain anything except an inquiry message.

gps_offer_negotiation_context offers a list of capability stubs, with or without the full details in each of them. The application might decide to present a default set of capabilities to the transacting party, in which case, it can call this function.

gps_process_negotiation_context

When a message is received with a particular negotiation context, it is processed by this function to do either of:

deliver a list of applicable capabilities, return an error condition, if a transaction is not possible, since there are no capabilities which can possibly be used In cases of difficulty, the functions in the UI Manager are called to prompt user for some input, to help in making negotiation decisions process the input token, using the corresponding negotiation context from the context database, generate error message if the processing fails gps_finalize_negotiation_context Decide upon selecting single/multiple payment capability/capabilities when the application or the user decides to put an end to the current negotiation situation gps_accept_negotiation_context Generate an acceptance message when the offered payment capability satisfies the constraints set forth by the capability manager and the preference manager; else generate an error or exception Also, the negotiation manager takes care of updating the existing context and does some form of format conversion etc.

User Interface (UI) (364)

This module is used to create a more sophisticated user interface, to allow different levels of agent freedom. In case of a situation where the payment negotiator cannot take a decision of its own, due to some reason, this module is invoked to receive inputs from user and help payment negotiator proceed with the negotiation scenario. For instance, the user might have the preference set as: If the transaction amount goes over $10.00, let it go with my knowledge. In this case, it is the job of the payment negotiator to inform the user, and ask for his approval, if the transaction amount goes over $10.00.

The User Interface module (364) is implemented as an Interface, so that the applications can implement them to provide their own way of look and feel to the users. At the very minimum, this is the functionality that the UI has to provide the following utilities.

GetUserHelp:

This is the top level function which invokes other subfunctions, based up on the type of response needed from the user, for instance manually sorting capabilities, select one of them, canceling etc.

GetOrderedList:

To ask the user to manually sort the capability list presented

GetChoices

To ask the user to choose one/many of payment capabilities presented select:

To ask the user to select a specific capability, since it is being requested by the other party finalize:

To ask the user whether to continue with the negotiation process or not, and if user decides not to go further with negotiation, prompt him to select a list of mechanisms, if for some reason, negotiation has gone long enough fillDetails:

To ask the user to manually fill in the details for a payment mechanism displayMessage:

To display messages on the screen to keep the user aware of what is happening

Each of the methods should have a facility for the user to abort the transaction from that point on. Additional methods may be provided by the application developers, to give the user more control over the negotiation process.

Error Handling and Reporting

Errors of several types may occur while the processing of the input token takes place. The ways that are suggested to handle errors are:

1) Signals of a corresponding kind are sent to the parent application upon occurrence of a particular error;
2) Throw exceptions upon an occurrence of an error; Applications can catch them during their operations and refer to the exception table to perform the recovery from error conditions;
3) Error information is included within the token, as a status code; Application can read the code from the token object and invoke a handler for that error type. Errors and their corresponding recovery steps are stored in a static error handler table, which is visible to all parts of the application and payment framework. Common errors that might occur include:

No requested Payment Method available;

Payment Method available, But no installed Payment Capability supports it;

Payment Method available, But no requested Payment Protocol is supported;

Indicated Payment Method, Payment Capability, Payment Protocol are supported, but Payment Instrument is not accepted;

Malformed Token;

Abort/Cancel/Retry messages; and

Other runtime errors.

When an application receives a signal of a kind or an exception of a type, then it has to perform the sequence of steps specified in the global error table to recover from the error. More detailed version of error handling and recovery is deferred until implementation.

Message Flow

FIG. 4 is a transaction logic diagram detailing an electronic payment negotiation in accordance with a preferred embodiment. A 440 is the person who wishes to have a transaction with B 442, and initiates the transaction 400 by transmitting a transport_token 410 to B's receiving merchant site 420. B responds to the messages from A, by either providing a service or delivering a requested resource 430. A performs the following detailed steps to converse with B, to establish a negotiation session:

Passes a null negotiation token to its NegotiationManager Object and it generates a default inquiry token, which may or may not contain any of the payment methods that are available. Or generate a token with a list of capability stubs without full details of each of the stubs 400.

The output token would be converted into a format, suitable for transporting it. IOProcessor converts tokens into transport_tokens 400–410.

B receives a message representing a request from A, with its negotiation intentions 420.

B extracts the token from the message and has its NegotiationManager process it and present the results back to A, in the form of a NegotiationToken 430.

This process continues, until any one of the parties decide to put an end to the negotiation session by selecting or asking to select one of the possible payment methods 437–460.

Once the payment mechanism is chosen, the corresponding plug-in is activated to deliver more specific details.

Security Considerations

The security attacks that are foreseen in the payment negotiation arena typically involve denial of service attacks, by corrupting the messages exchanged between the two parties in the process. Some of the methods which are utilized to surmount these attacks, include:

1) utilization of a secure channel (e.g. SSL, PCT) is the easiest way to achieve the security level to overcome this attack and which does not modify the message structures and, 2) using content-type application/<pay-sys>, for transferring payment negotiation information, where pay-sys is the particular payment method selected. The contents could be MOSS [MOSS] signed and protected, which might change the message format and structures, but would help us add a level of security and authenticity.

Conclusion

The process of payment method negotiation helps peer computers to communicate and achieve an agreement on the method with which to transact. Predefined user preferences allow convenience to the user in terms of simplicity and automatic payment method selection. When installed with the Generic Payment Services (GPS) framework, Payment Negotiation API helps in eliminating the overhead of incorporating individual payment system plug-ins with applications is eliminated and multiple existing and upcoming payment systems can be integrated with the application in a systematic fashion. While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A method for negotiating a mutually acceptable payment processing framework between one or more client computers and one or more merchant computers coupled by a network, comprising the steps of:

(a) generating a client message including a client token and transmitting the client message from the client computer to the merchant computer utilizing the network;

(b) receiving the client message at the merchant computer, utilizing the client token to generate a merchant message including a merchant token containing one or more merchant acceptable payment processing frameworks, and transmitting the merchant message from the merchant computer to the client computer;

(c) receiving the merchant message at the client computer, comparing the one or more merchant acceptable payment processing frameworks contained in the merchant token to one or more client acceptable payment processing frameworks;

(d) selecting the mutually acceptable payment processing framework, generating a message including a negotiation finalization token indicating the mutually acceptable payment processing framework for the client computer and the merchant computer, and transmitting the message from the client computer to the merchant computer; and (e) receiving the message at the merchant computer, utilizing the negotiation finalization token to transmit an indicia of the mutually acceptable payment processing framework to the client computer.

2. The method as recited in claim 1, wherein the network is the Internet.

3. The method as recited in claim 1, including the step of generating the client token by transmitting a null token to a client negotiation manager.

4. The method as recited in claim 1, wherein the client token includes payment processing information that is acceptable to the client computer.

5. The method as recited in claim 1, wherein the client token includes a list of payment capability stubs without complete payment processing information.

6. The method as recited in claim 1, wherein the merchant computer extracts the client token from the client message and processes the client token utilizing a merchant computer negotiation manager.

7. The method as recited in claim 1, wherein the mutually acceptable payment processing framework includes a payment processing method.

8. The method as recited in claim 1, wherein the mutually acceptable payment processing framework includes a payment capability.

9. The method as recited in claim 1, wherein the mutually acceptable payment processing framework includes a secure payment protocol.

10. The method as recited in claim 9, wherein the secure payment protocol is a secure socket layer protocol (SSL).

11. The method as recited in claim 1, further comprising the steps of:

(c1) selecting one or more mutually acceptable payment processing frameworks, generating a second client message including a second client token including the one or more mutually acceptable payment processing frameworks, and transmitting the second client message from the client computer to the merchant computer; and (c2) selecting at least one of the one or more mutually acceptable payment processing frameworks, generating a second merchant message including a second merchant token including the selected mutually acceptable payment processing frameworks, and transmitting the second merchant message from the merchant computer to the client computer.

12. The method as recited in claim 1, wherein steps (c1) and (c2) are repeated.

13. The method as recited in claim 1, wherein the mutually acceptable payment processing framework includes account information or an account proxy.

14. The method as recited in claim 1, wherein the mutually acceptable payment processing framework includes a payment instrument.

15. The method as recited in claim 1, wherein the mutually acceptable payment processing framework includes a payment mechanism.

16. The method as recited in claim 1, wherein the mutually acceptable payment processing framework includes a service provider.

17. An apparatus for negotiating a mutually acceptable payment processing framework between one or more client computers and one or more merchant computers coupled by a network, comprising:

(a) first software that generates a client message including a client token and transmitting the client message from the client computer to the merchant computer utilizing the network;

(b) second software that receives the client message at the merchant computer, utilizes the client token to generate a merchant message including a merchant token containing one or more merchant acceptable payment processing frameworks, and transmits the merchant message from the merchant computer to the client computer;

(c) third software that receives the merchant message at the client computer, compares the one or more merchant acceptable payment processing frameworks contained in the merchant token to one or more client acceptable payment processing frameworks;

(d) fourth software that selects the mutually acceptable payment processing framework, generates a message including a negotiation finalization token indicating the mutually acceptable payment processing framework for the client computer and the merchant computer, and transmits the message from the client computer to the merchant computer; and (e) fifth software that receives the message at the merchant computer, utilizes the negotiation finalization token to transmit an indicia of the mutually acceptable payment processing framework to the client computer.

18. The apparatus as recited in claim 17, wherein the Internet is utilized to transmit information between the one or more client computers and the one or more merchant computers.

19. The apparatus as recited in claim 17, wherein the client token is generated by transmitting a null token to a client negotiation manager.

20. The apparatus as recited in claim 17, wherein the client token includes payment processing information that is acceptable to the client computer.

21. The apparatus as recited in claim 17, wherein the client token includes a list of payment capability stubs without complete payment processing information.

22. The apparatus as recited in claim 17, wherein the merchant computer extracts the client token from the client message and processes the client token utilizing a merchant computer negotiation manager.

23. The apparatus as recited in claim 17, wherein the mutually acceptable payment processing framework includes a payment processing method.

24. The apparatus as recited in claim 17, wherein the mutually acceptable payment processing framework includes a payment capability.

25. The apparatus as recited in claim 17, wherein the mutually acceptable payment processing framework includes a secure payment protocol.

26. The apparatus as recited in claim 17, further comprising:

(c1) a sixth software that selects one or more mutually acceptable payment processing frameworks, generates a second client message including a second client token including the one or more mutually acceptable payment processing frameworks, and transmits the second client message from the client computer to the merchant computer; and (c2) a seventh software that selects at least one of the one or more mutually acceptable payment processing frameworks, generates a second merchant message including a second merchant token including the selected mutually acceptable payment processing frameworks, and transmits the second merchant message from the merchant computer to the client computer.

27. The apparatus as recited in claim 17, wherein the mutually acceptable payment processing framework includes account information or an account proxy.

28. The apparatus as recited in claim 17, wherein the mutually acceptable payment processing framework includes a payment instrument.

29. The apparatus as recited in claim 17, wherein the mutually acceptable payment processing framework includes a payment mechanism.

30. The apparatus as recited in claim 17, wherein the mutually acceptable payment processing framework includes a service provider.

31. A computer program embodied on a computer-readable medium for negotiating a mutually acceptable payment processing framework between one or more client computers and one or more merchant computers coupled by a network, comprising:

(a) a first code segment that generates a client message including a client token and transmitting the client message from the client computer to the merchant computer utilizing the network;

(b) a second code segment that receives the client message at the merchant computer, utilizes the client token to generate a merchant message including a merchant token containing one or more merchant acceptable payment processing frameworks, and transmits the merchant message from the merchant computer to the client computer;

(c) a third code segment that receives the merchant message at the client computer, compares the one or more merchant acceptable payment processing frameworks contained in the merchant token to one or more client acceptable payment processing frameworks;

(d) a fourth code segment that selects the mutually acceptable payment processing framework, generates a message including a negotiation finalization token indicating the mutually acceptable payment processing framework for the client computer and the merchant computer, and transmits the message from the client computer to the merchant computer; and (e) a fifth code segment that receives the message at the merchant computer, utilizes the negotiation finalization token to transmit an indicia of the mutually acceptable payment processing framework to the client computer.

32. The computer program as recited in claim 31, wherein the Internet is utilized to transmit information between the one or more client computers and the one or more merchant computers.

33. The computer program as recited in claim 31, wherein the client token is generated by transmitting a null token to a client negotiation manager.

34. The computer program as recited in claim 31, wherein the client token includes payment processing information that is acceptable to the client computer.

35. The computer program as recited in claim 31, wherein the client token includes a list of payment capability stubs without complete payment processing information.

36. The computer program as recited in claim 31, wherein the merchant computer extracts the client token from the client message and processes the client token utilizing a merchant computer negotiation manager.

37. The computer program as recited in claim 31, wherein the mutually acceptable payment processing framework includes a payment processing method.

38. The computer program as recited in claim 31, wherein the mutually acceptable payment processing framework includes a payment capability.

39. The computer program as recited in claim 31, wherein the mutually acceptable payment processing framework includes a secure payment protocol.

40. The computer program as recited in claim 31, further comprising:

(c1) a sixth code segment that selects one or more mutually acceptable payment processing frameworks, generates a second client message including a second client token including the one or more mutually acceptable payment processing frameworks, and transmits the second client message from the client computer to the merchant computer; and (c2) a seventh code segment that selects at least one of the one or more mutually acceptable payment processing frameworks, generates a second merchant message including a second merchant token including the selected mutually acceptable payment processing frameworks, and transmits the second merchant message from the merchant computer to the client computer.

41. The computer program as recited in claim 31, wherein the mutually acceptable payment processing framework includes account information or an account proxy.

42. The computer program as recited in claim 31, wherein the mutually acceptable payment processing framework includes a payment instrument.

43. The computer program as recited in claim 31, wherein the mutually acceptable payment processing framework includes a payment mechanism.

44. The computer program as recited in claim 31, wherein the mutually acceptable payment processing framework includes a service provider.

* * * * *